(12) United States Patent
Murakami

(10) Patent No.: US 7,630,007 B2
(45) Date of Patent: Dec. 8, 2009

(54) DRIVING METHOD FOR SOLID-STATE IMAGING DEVICE AND SOLID-STATE IMAGING DEVICE

(75) Inventor: Ichiro Murakami, Kyoto (JP)

(73) Assignee: Panasonic Corporation, Osaka (JP)

( * ) Notice: Subject to any disclaimer, the term of this patent is extended or adjusted under 35 U.S.C. 154(b) by 367 days.

(21) Appl. No.: 11/767,087

(22) Filed: Jun. 22, 2007

(65) Prior Publication Data
US 2008/0024638 A1 Jan. 31, 2008

(30) Foreign Application Priority Data
Jul. 26, 2006 (JP) .............................. 2006-203444

(51) Int. Cl.
H04N 9/64 (2006.01)
(52) U.S. Cl. ...................................... 348/249
(58) Field of Classification Search ................. None
See application file for complete search history.

(56) References Cited

U.S. PATENT DOCUMENTS
6,798,450 B2 * 9/2004 Baer ........................ 348/248

FOREIGN PATENT DOCUMENTS
JP 20010119629 4/2001
JP 20050328212 11/2005

OTHER PUBLICATIONS
English language Abstract of JP 2005-328212.
English language Abstract of JP 2001-119629.
U.S. Appl. No. 11/735,740 to Murakami, filed Apr. 16, 2007.
U.S. Appl. No. 11/763,568 to Murakami, filed Jun. 15, 2007.

* cited by examiner

Primary Examiner—Justin P Misleh
(74) Attorney, Agent, or Firm—Greenblum & Bernstein, P.L.C.

(57) ABSTRACT

According to the invention, a driving method for a solid-state imaging device includes: a first holding step of holding electric charges which cause smear and are obtained from incident light in a first holding unit, in a previous field period which appears temporally earlier than a predetermined field; a second holding step of holding signal charges obtained from the incident light in a second holding unit, in the predetermined field period; a first equalization step of equalizing electric charges which cause smear and are obtained from the incident light in a subsequent field period which appears later than the predetermined field and the electric charges which cause smear and are held by the first holding unit; and a first subtraction step of subtracting the electric charges which cause smear and are equalized in the first equalization step from the signal charges which are held by the second holding unit.

13 Claims, 14 Drawing Sheets

DRIVING METHOD FOR SOLID-STATE IMAGING DEVICE AND SOLID-STATE IMAGING DEVICE

BACKGROUND OF THE INVENTION (1) Field of the Invention

The present invention relates to a driving method for a solid-state imaging device having pixels arranged in a matrix form, and a solid-state imaging device.

(2) Description of the Related Art

Video cameras and digital still cameras tend to grow in demand year after year. Such growth in demand widens the range of users. Not only old users but also new users require an image having a wide dynamic range. Therefore, it is necessary to develop a solid-state imaging device, in particular, a CCD (Charge Coupled Device) solid-state imaging device for use in a camera, so as to satisfy such requirement of the users.

Hereinafter, a typical CCD image sensor is described. FIG. 1 shows a structure of the typical CCD image sensor. The CCD image sensor includes photodiodes 901 arranged in a matrix form, vertical CCDs 903 each disposed at a left side of the photodiode 901 to serve as a vertical charge transfer path, transfer gates 902 each connecting between the photodiode 901 and the vertical CCD 903, a horizontal CCD 907 disposed on lower ends of the vertical CCDs 903 to serve as a horizontal charge transfer path, and an output unit 908 outputting a voltage value corresponding to electric charges externally from the CCD image sensor. The photodiode 901 converts incident light into electric charges. The transfer gate 902 transfers the electric charges obtained through the photoelectric conversion by the photodiode 901 to the vertical CCD 903. The vertical CCD 903 transfers the electric charges transferred from the transfer gate 902 to the horizontal CCD 907. The horizontal CCD 907 transfers the electric charges transferred from the vertical CCD 903 to the output unit 908. The output unit 908 converts the electric charges into a voltage, and then outputs a voltage value obtained through such conversion externally from the CCD image sensor.

Next, a cause for occurrence of smear is described.

FIG. 2 shows a sectional view of a pixel in a typical CCD solid-state imaging device. In the solid-state imaging device, a photodiode unit (photoelectric conversion unit) 4 includes an n-type silicon substrate 10, a $p^{--}$-type well region 11, an n-type charge accumulation region 12 and a $p^{++}$-type region 13. Also in the solid-state imaging device, a vertical CCD unit 5 includes an n-type buried channel region 14, a $p^{-}$-type region 15 formed below the n-type buried channel region 14, and a gate electrode 16 such as a polysilicon film. The vertical CCD unit 5 has a function of transferring signal charges obtained through photoelectric conversion to a horizontal CCD unit.

A transfer gate unit 17 is formed between the photodiode unit 4 and the vertical CCD unit 5. A $p^{+}$-type channel stop region 18 is formed at a position opposite to the transfer gate unit 17 with respect to the photodiode unit 4. In other words, the photodiode unit 4 is interposed between the transfer gate unit 17 and the $p^{+}$-type channel stop region 18. A gate insulating film 19 having a lamination structure of a silicon oxide film and a silicon nitride film is formed on the n-type buried channel region 14, the transfer gate unit 17 and the $p^{+}$-type channel stop region 18. A light shielding film 8 such as a tungsten film is formed on the gate electrode 16 with an interlayer insulating film 20 interposed therebetween. A reflection preventing film 21 is formed on a surface of the photodiode unit 4.

Smear occurs due to the following reason. That is, upon accumulation of electric charges obtained through photoelectric conversion, the electric charges flow into the vertical CCD unit 5 without being accumulated in the photodiode unit 4, so that a false signal is generated. This fact is described with reference to FIG. 2. It is considered that smear occurs due to the following four reasons in general. (i) Light transmits through the light shielding film 8, reaches the vertical CCD unit 5, and is converted into electric charges in the vertical CCD unit 5, so that smear occurs. (ii) Incident light is partially leaked from an interface between the light shielding film 8 and the gate insulating film 19, and then transmits to the vertical CCD unit 5 while reflecting at multiple paths in the light shielding film 8, between the gate insulating film 19 and the gate electrode 16, and between the gate insulating film 19 and the light shielding film 8. Thereafter, the light is converted into electric charges in the vertical CCD unit 5, so that smear occurs. (iii) Electric charges obtained through photoelectric conversion at an exterior of the photodiode unit 4 are diffused, and then reach the vertical CCD unit 5, so that smear occurs. (iv) Electric charges obtained through photoelectric conversion at a recombination region in the $p^{++}$-type region 13 on the surface of the photodiode unit 4 are transferred or diffused by a weak electric field. Thereafter, the electric charges reach the vertical CCD unit 5, and then are detected as a false signal, so that smear occurs.

It is considered that smear occurs due to the aforementioned reasons. In response to formation of a finer pixel, there are constantly required countermeasures against smear. This is based on the following reasons. In the case where a pixel size is simply shrunk, a width of the transfer gate unit 17 shown in FIG. 2, that is, a distance between the photodiode unit 4 and the vertical CCD unit 5 becomes short. Thus, a light transmission distance in the aforementioned case (ii) becomes short, for example. Consequently, an amount of the light to be absorbed upon transmission is decreased, and the light readily reaches the vertical CCD unit 5, resulting in occurrence of smear. In addition, an electric-charge diffusion distance in the aforementioned case (iii) or (iv) becomes short. Consequently, the electric charges readily reach the vertical CCD unit 5, resulting in occurrence of smear. As described above, the simple shrinkage in pixel size causes occurrence of smear.

In order to suppress occurrence of smear, there is known the following technique. That is, by provision of a packet for reading out normal signal charges (signal charges plus smear charges) and a packet for reading out only smear charges, the smear charges are subtracted from the normal signal charges (signal charges plus smear charges) (refer to, for example, Japanese Unexamined Patent Application Publications No. 2005-328212 and No. 2001-119629).

Japanese Laid-Open Patent Application No. 2005-328212 discloses a technique for reading out both signal charges and smear charges from a pixel and reading out only smear charges from a different pixel, and then subtracting the smear charges from the signal charges and the smear charges.

Japanese Unexamined Patent Application Publication No. 2001-119629 discloses a technique for reading out both signal charges and smear charges and reading out only smear charges from one pixel at different timings, and then subtracting the smear charges from the signal charges and the smear charges.

SUMMARY OF THE INVENTION

According to the technique disclosed in Japanese Unexamined Patent Application Publication No. 2005-328212, however, the subtraction process is performed using different pixels, that is, a pixel from which both signal charges and smear charges are read out and a pixel from which only smear charges are read out. Therefore, even when such pixels adjoin to each other, smear charges resulting from the subtraction process are different from actual smear charges. In the case where filters are arranged in, for example, a Bayer arrangement, particularly, electric charges which cause smear and are obtained from one filter are largely different from electric charges which cause smear and are obtained from another filter. Moreover, in the case where electric charges are extracted from filters of an identical color, such filters are arranged with at least another filter interposed therebetween, resulting in a large difference with actual electric charges which cause smear. This causes a phenomenon such as black level depression occurring in both a still image and a moving image at a low illuminance.

According to the technique disclosed in Japanese Unexamined Patent Application Publication No. 2001-119629, smear charges are extracted from one pixel; however, a timing that both signal charges and smear charges are extracted is temporally different from a timing that only smear charges are extracted. Consequently, smear charges to be subtracted are different from actual smear charges due to a temporal deviation upon capturing of a moving image. When an amount of electric charges which cause smear is too large, a phenomenon such as black level depression occurs. That is, in a conventional method for suppressing smear using a subtraction process, smear charges for use in the subtraction process are different from effective smear charges.

The present invention is conceived in order to solve the aforementioned conventional problems. An object of the present invention is to provide a solid-state imaging device capable of reducing a difference between electric charges which cause smear and are used in a subtraction process and effective electric charges which cause smear in a method for suppressing occurrence of smear using the subtraction process, and a driving method for the same.

In order to solve the problems and achieve the object, a driving method for a solid-state imaging device according to the present invention is a driving method for a solid-state imaging device which has a plurality of pixels arranged in a matrix form and uses a frame period including a field period for acquiring signal charges of the pixel and a field period for acquiring electric charges causing smear, the method includes: a first holding step of holding electric charges which cause smear and are obtained from incident light in a first holding unit, in a previous field period which is one of two different field periods temporally and evenly spaced away from a predetermined field period in the frame period and appears temporally earlier, for each of first pixels included in the plurality of pixels; a second holding step of holding signal charges which are obtained from the incident light in a second holding unit, in the predetermined field period, for each of the first pixels; a first equalization step of equalizing electric charges which cause smear and are obtained from the incident light in a subsequent field period which is the other one of the two field periods and appears temporally later, and the electric charges which cause smear and are held by the first holding unit, in a subsequent field period which is the other one of the two field periods and appears temporally later, for each of the first pixels; and a first subtraction step of subtracting the electric charges which cause smear and are equalized in the first equalization step from the signal charges which are held by the second holding unit, for each of the first pixels.

With this method, equalization is performed on electric charges which cause smear and are obtained in the two field periods temporally and evenly spaced away from the predetermined field period (hereinafter, such electric charge will be referred to as "smear charges" in some cases). Then, by subtraction of the equalized smear charges from signal charges which are obtained in the predetermined field period, signal charges in a frame period are obtained. A temporal change in smear charges is locally linear in a short time. Accordingly, a value obtained through the equalization of the smear charges obtained in the two field periods temporally and evenly spaced away from the predetermined field period becomes almost equal to the smear charges contained in the signal charges obtained in the predetermined field period. According to the present invention, therefore, the driving method for a solid-state imaging device can reduce a difference between electric charges which cause smear and are used in a subtraction process and effective electric charges which cause smear. Specifically, it is possible to suppress occurrence of black level depression caused by a difference with effective electric charges causing smear due to a temporal difference, unlike the conventional technique disclosed in Japanese Unexamined Patent Application Publication No. 2001-119629. Moreover, both signal charges and smear charges and only smear charges are read out from one pixel at different timings. Thus, it is possible to suppress occurrence of black level depression caused by a difference with effective electric charges causing smear due to a difference between pixels, unlike the conventional technique disclosed in Japanese Unexamined Patent Application Publication No. 2005-328212.

In addition, a transfer speed of a vertical CCD in the two field periods is higher than a transfer speed of the vertical CCD in the predetermined field period, and the method may further include a gain correction step of performing gain correction on the electric charges which cause smear and are equalized in the first equalization step, for each of the first pixels, in which the first subtraction step may include subtracting the electric charges which cause smear and are subjected to the gain correction in the gain correction step from the signal charges which are held by the second holding unit, for each of the first pixels.

With this method, a smear-charge transfer speed of the vertical CCD is made higher than a signal-charge transfer speed of the vertical CCD. An amount of signal charges is larger than an amount of smear charges. Accordingly, there occurs no transfer failure even when the smear-charge transfer speed of the vertical CCD is made higher than the signal-charge transfer speed of the vertical CCD. Thus, it is possible to improve a readout speed for the whole electric charges. In a gain correction step, gain correction is performed based on a ratio of transfer speeds of the vertical CCD, so that equalized smear charges can be corrected so as to be equal to the smear charges read out in the predetermined field period.

In addition, the frame period includes temporally-successive first, second and third field periods, the predetermined field period is the second field period, the first equalization step may include equalizing the electric charges which cause smear and are obtained from the incident light in the first field period and the electric charges which cause smear and are obtained from the incident light in the third field period, for each of the first pixels, and the first subtraction step may include subtracting the electric charges which cause smear and are equalized in the first equalization step from the signal charges which are obtained from the incident light in the second field period, for each of the first pixels, to calculate signal charges in the frame period.

With this method, equalization is performed on smear charges obtained in the first field period and the third field period. Then, by subtraction of the equalized smear charges from signal charges obtained in a second field period, signal charges in a frame period are obtained. A temporal change in smear charges is locally linear in a short time. Accordingly, a value obtained through the equalization of the smear charges obtained in the first field period and the third field period becomes almost equal to smear charges contained in the signal charges obtained in the second field period. Therefore, the driving method for a solid-state imaging device according to the present invention can reduce a difference between electric charges which cause smear and are used in a subtraction process, and effective electric charges which cause smear.

In addition, the frame period and an immediately-after frame period which appears immediately after the frame period include temporally-successive first and second field periods, respectively, the predetermined field period is the second field period of the frame period, the first equalization step may include equalizing electric charges which cause smear and are obtained from incident light in the first field period of the frame period and electric charges which cause smear and are obtained from the incident light in the first field period of the immediately-after frame period, for each of the first pixels, and the first subtraction step may include subtracting the electric charges which cause smear and are equalized in the first equalization step from signal charges which are obtained from the incident light in the second field period of the frame period, for each of the first pixels, to calculate signal charges in the frame period.

With this method, equalization is performed on smear charges obtained in the first field period of the predetermined frame period and smear charges obtained in the first field period of the immediately-after frame period which appears immediately after the predetermined frame period. Then, by subtraction of the equalized smear charges from signal charges obtained in the second field period of the predetermined frame period, signal charges in the predetermined frame period are obtained. A temporal change in smear charges is locally linear in a short time. Accordingly, a value obtained through the equalization of the smear charges obtained in the first field period of the predetermined frame period and the smear charges obtained in the first field period of the immediately-after frame period becomes almost equal to smear charges contained in the signal charges obtained in the second field period of the predetermined field period. Therefore, the driving method for a solid-state imaging device according to the present invention can reduce a difference between electric charges which cause smear and are used in a subtraction process and effective electric charges which cause smear. Further, since one frame period includes two field periods, the aforementioned effects can be attained by operations using a normal frame period method, leading to facilitation of a drive circuit configuration. In addition, the respective units can be readily operated at a high speed.

In addition, the two different field periods temporally and evenly spaced away from the predetermined field period may be two field periods adjoining to the predetermined field period with the predetermined period interposed therebetween.

With this method, smear charges are read out in the two field periods each adjoining the predetermined field period. Thus, it is possible to readily control an operation.

In addition, the plurality of pixels include the first pixels and second pixels included in each column, the method may further include: a third holding step of holding electric charges which cause smear and are obtained from incident light in a third holding unit, in the predetermined field period, for each of the second pixels; a fourth holding step of holding signal charges which are obtained from the incident light in a fourth holding unit, in the subsequent field period, for each of the second pixels; a second equalization step of equalizing electric charges which cause smear and are obtained from the incident light in a field period which appears subsequent to the subsequent field period and is spaced at a temporal distance equal to a distance from the subsequent field period to the predetermined field period, and the electric charges which cause smear and are held by the third holding unit, for each of the second pixels; and a second subtraction step of subtracting the electric charges which cause smear and are equalized in the second equalization step from the signal charges which are held by the fourth holding unit, for each of the second pixels.

With this method, only smear charges are read out from the first pixels in the predetermined field period, and signal charges in the second pixels are obtained. In electric charges to be transferred by a vertical CCD, therefore, a packet for only smear charges and a packet for signal charges are mixed. Accordingly, when a region for use in transfer of signal charges is made larger than a region for use in transfer of only smear charges upon transfer of signal charges by a vertical CCD, a maximum amount of electric charges to be transferred by the vertical CCD can be made large, resulting in efficient transfer of the signal charges.

In addition, a width of a potential well in a vertical transfer direction for use in transfer of the electric charges which cause smear by a vertical CCD may be set narrower than a width of a potential well in the vertical transfer direction for use in transfer of the signal charges by the vertical CCD.

With this method, a region (the width of the potential well in the vertical direction) for use in transfer of signal charges is made larger than a region for use in transfer of only smear charges upon transfer of signal charges by the vertical CCD. An amount of the signal charges is larger than an amount of the smear charges. Accordingly, even when the region for use in transfer of the smear charges in the vertical CCD is made smaller than the region for use in transfer of the signal charges in the vertical CCD, there occurs no deterioration of electric charges upon transfer, resulting in improvement of a readout speed for the whole electric charges.

In addition, the first pixels and the second pixels may be arranged alternately in a column direction.

With this method, only smear charges are read out from one of adjoining pixels whereas signal charges are read out from the other pixel. Accordingly, a packet for only smear charges adjoins to a packet for signal charges upon transfer by the vertical CCD, so that such transfer by the vertical CCD can be readily controlled.

The frame period and an immediately-after frame period which appears immediately after the frame period include temporally-successive first and second field periods, respectively, the predetermined field period is the second field period of the frame period, the first equalization step may include equalizing electric charges which cause smear and are obtained from incident light in the first field period of the frame period and electric charges which cause smear and are obtained from the incident light in the first field period of the immediately-after frame period, for each of the first pixels, the first subtraction step may include subtracting the electric charges which cause smear and are equalized in the first equalization step from signal charges which are obtained from the incident light in the second field period of the frame period, for each of the first pixels, to calculate signal charges in the frame period, the second equalization step may include equalizing electric charges which cause smear and are obtained from the incident light in the second field of the frame period and electric charges which cause smear and are obtained from the incident light in the second field period of the immediately-after frame period, for each of the second pixels, and the second subtraction step may include subtracting the electric charges which cause smear and are equalized in the second equalization step from signal charges which are obtained from the incident light in the first field period of the immediately-after frame period, for each of the second pixels, to calculate signal charges in the frame period.

With this method, only smear charges are read out from the first pixels and signal charges are read out from the second pixels in the first field period of each frame period. In addition, signal charges are read out from the first pixels and only smear charges are read out from the second pixels in the second field period of each frame period. Accordingly, processes in the respective field periods can be performed regularly, so that operations can be readily controlled.

In addition, the electric charges which cause smear may be obtained from the incident light in such a manner that no readout pulse for reading the signal charge is applied from the pixel to a vertical CCD.

With this method, smear charges can be read out by a simple process.

In addition, a solid-state imaging device according to the present invention is a solid-state imaging device which has a plurality of pixels arranged in a matrix form and uses a frame period including a field period for acquiring signal charges of the pixels and a field period for acquiring electric charges causing smear, the solid-state imaging device includes: a first holding unit which holds electric charges which cause smear and are obtained from incident light, in a previous field period which is one of two different field periods temporally and evenly spaced away from a predetermined field period in the frame period and appears temporally earlier, for each of first pixels included in the plurality of pixels; a second holding unit which holds signal charges which are obtained from the incident light, in the predetermined field period, for each of the first pixels; a first equalization unit operable to equalize electric charges which cause smear and are obtained from the incident light in a subsequent field period which is the other one of the two field periods and appears temporally later, and the electric charges which cause smear and are held by the first holding unit, for each of the first pixels; and a first subtraction unit which subtracts the electric charges which cause smear and are equalized by the first equalization unit from the signal charges which are held by the second holding unit, for each of the first pixels.

With this configuration, equalization is performed on electric charges which cause smear and are obtained in the two field periods each temporally and evenly spaced away from a predetermined field period (smear charges). Then, by subtraction of the equalized smear charges from signal charges obtained in the predetermined field period, signal charges in a frame period are obtained. A temporal change in smear charges is locally linear in a short time. Accordingly, a value obtained through the equalization of the smear charges obtained in the two field periods each temporally and evenly spaced away from the predetermined field period becomes almost equal to smear charges contained in the signal charges obtained in the predetermined field period. According to the present invention, therefore, the solid-state imaging device can reduce a difference between electric charges which cause smear and are used in a subtraction process and effective electric charges which cause smear.

The solid-state imaging device in an aspect of the invention, in which the plurality of pixels include the first pixels and second pixels included in each column, the solid-state imaging device may further include: a third holding unit which holds electric charges which cause smear and are obtained from incident light, in the predetermined field period, for each of the second pixels; a fourth holding unit which holds signal charges which are obtained from the incident light, in the subsequent field period, for each of the second pixels; a second equalization unit which equalizes electric charges which cause smear and are obtained from the incident light in a field period which appears subsequent to the subsequent field period and is spaced at a temporal distance equal to a distance from the subsequent field period to the predetermined field period, and the electric charges which cause smear and are held by the third holding unit, for each of the second pixels; and a second subtraction unit which subtracts the electric charges which cause smear and are equalized by the second equalization unit from the signal charges which are held by the fourth holding unit, for each of the second pixels.

With this configuration, only smear charges are read out from the first pixels in the predetermined field period, and signal charges in the second pixels are obtained. In electric charges to be transferred by a vertical CCD, therefore, a packet for only smear charges and a packet for signal charges are mixed. Accordingly, when a region for use in transfer of signal charges is made larger than a region for use in transfer of only smear charges upon transfer of signal charges by a vertical CCD, a maximum amount of electric charges to be transferred by the vertical CCD can be made large, resulting in efficient transfer of the signal charges.

The solid-state imaging device in an aspect of the invention may further include: a first vertical CCD which vertically transfers electric charges in a pixel in a predetermined column in a first direction; a second vertical CCD which vertically transfers electric charges in a pixel in a column other than the predetermined column in a second direction opposite to the first direction, the vertical transfer being controlled by a common signal together with the vertical transfer of the first vertical CCD; a first horizontal CCD which horizontally transfers the electric charges transferred from the first vertical CCD, the first horizontal CCD being disposed at one side of the region having the plurality of pixels arranged in a matrix form; a second horizontal CCD which horizontally transfers the electric charges transferred from the second vertical CCD, the second horizontal CCD being disposed at the other side of the region having the plurality of pixels arranged in a matrix form so as to be opposite to the first horizontal CCD; a first output unit which converts the electric charges transferred from the first horizontal CCD into a voltage value corresponding to the electric charges, and to output the voltage value to the first holding unit, the second holding unit, the third holding unit, the fourth holding unit, the first equalization unit and the second equalization unit; and a second output unit which converts the electric charges transferred from the second horizontal CCD into a voltage value corresponding to the electric charges, and to output the voltage value to the first holding unit, the second holding unit, the third holding unit, the fourth holding unit, the first equalization unit and the second equalization unit, in which the first pixels and second pixels are arranged alternately in a column direction and a row direction.

With this configuration, in a solid-state imaging device which includes two horizontal CCDs and can perform a readout operation at a high speed, a difference between electric charges which cause smear and are used in a subtraction process and effective electric charges which cause smear can be reduced. Further, a region for use in transfer of signal charges is made larger than a region for use in transfer of only smear charges upon transfer of signal charges by the vertical CCD, resulting in efficient transfer of the signal charges.

Thus, the present invention can provide a solid-state imaging device capable of reducing a difference between electric charges which cause smear and are used in a subtraction process and effective electric charges which cause smear in a method for suppressing occurrence of smear using the subtraction process, and a driving method for the same.

FURTHER INFORMATION ABOUT TECHNICAL BACKGROUND TO THIS APPLICATION

The disclosure of Japanese Patent Application No. 2006-203444 filed on Jul. 26, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENTS

Hereinafter, preferred embodiments of the present invention are described with reference to the drawings.

First Embodiment

In a solid-state imaging device according to the first embodiment of the present invention, one frame includes temporally-successive three fields. Only smear charges are acquired in the first field and the third field. On the other hand, both signal charges and smear charges are acquired in the second field. Further, by subtraction of an average value of the smear charges acquired in the first field and the third field from the signal charges and the smear charges acquired in the second field, it is possible to read out signal charges with a suppressed influence of the smear charges.

With regard to the solid-state imaging device according to the first embodiment, first, a structure is described.

Figure 1:
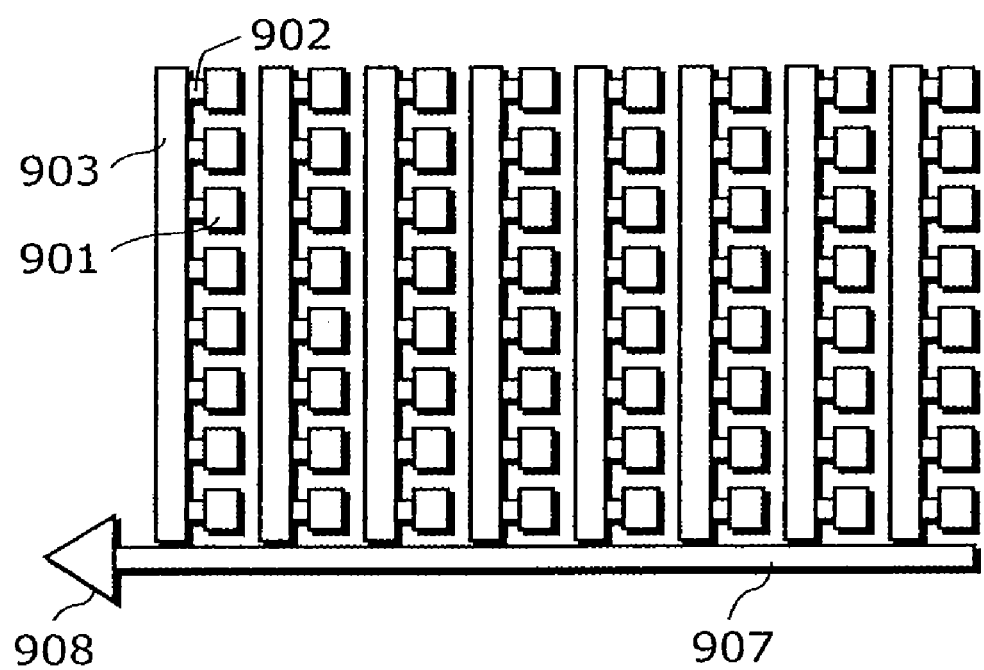
FIG. 1 shows a structure of a conventional CCD image sensor.
Figure 2:
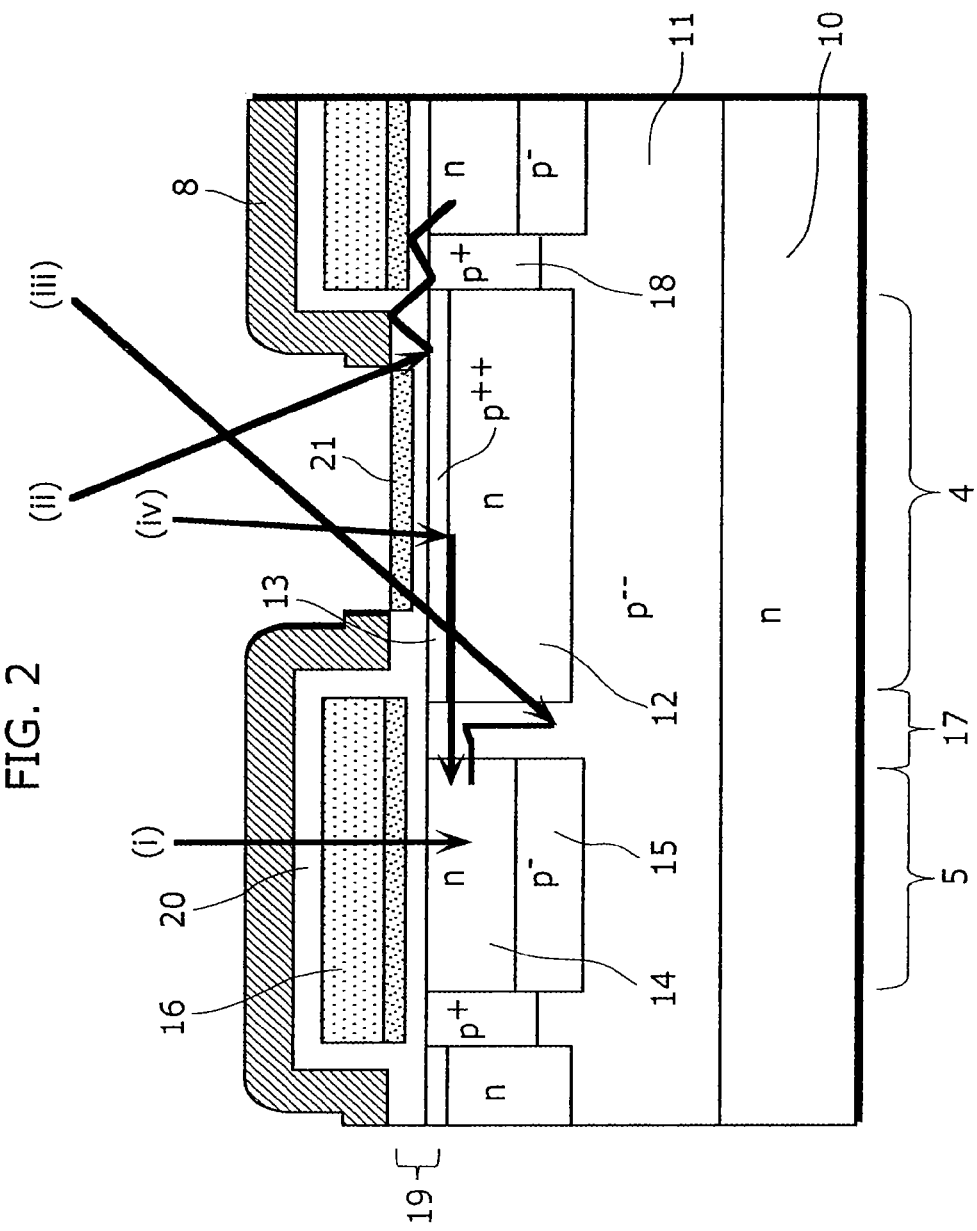
FIG. 2 shows a sectional view of a pixel in a conventional CCD solid-state imaging device.
Figure 3:
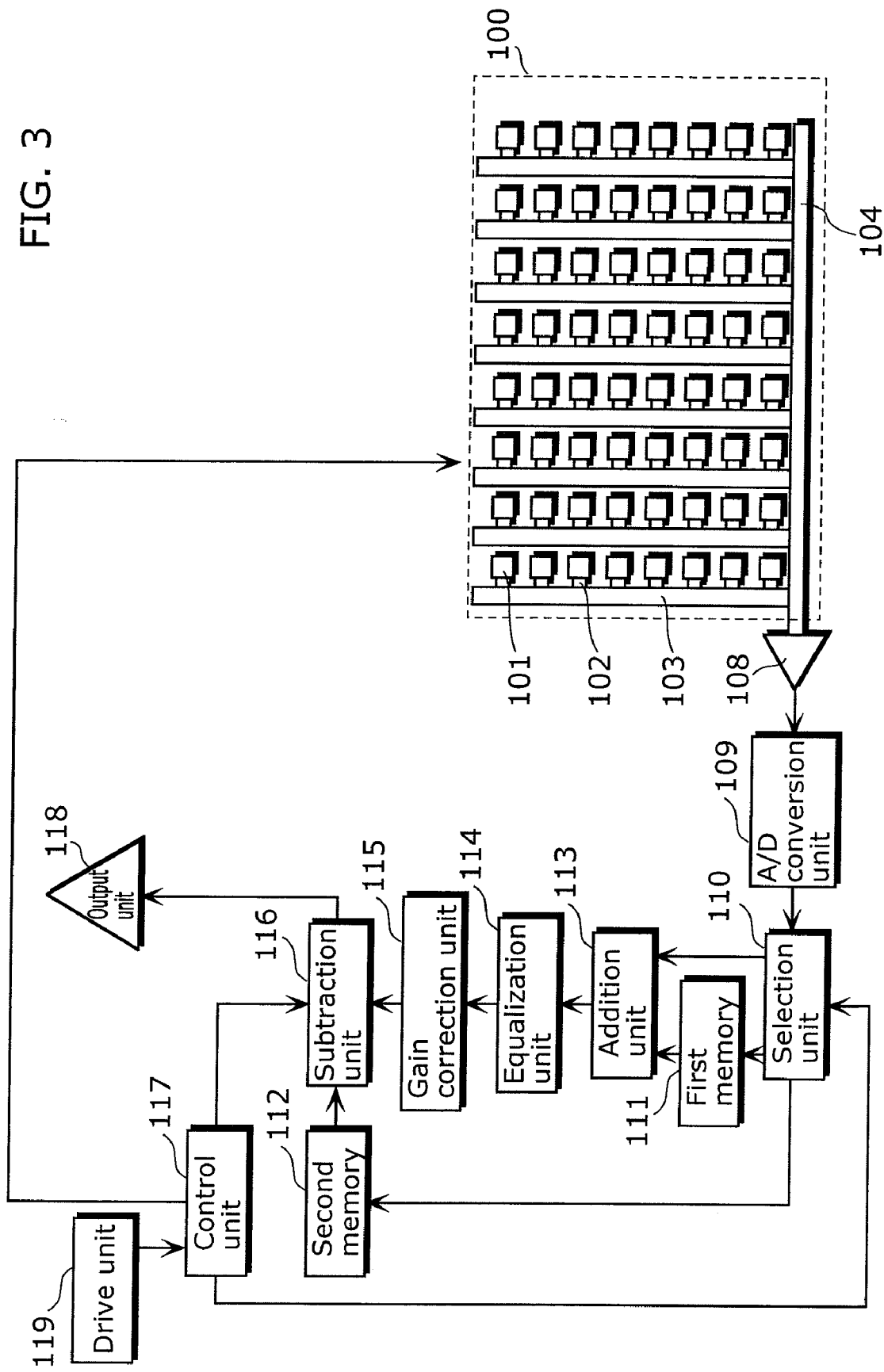
FIG. 3 shows a structure of a solid-state imaging device according to a first embodiment of the present invention.

FIG. 3 shows the structure of the solid-state imaging device according to the first embodiment. The solid-state imaging device according to the first embodiment includes a photoelectric conversion region (solid-state imaging element) 100, an output unit 108, an A/D conversion unit 109, a selection unit 110, a first memory 111, a second memory 112, an addition unit 113, an equalization unit 114, a gain correction unit 115, a subtraction unit 116, a control unit 117, an output unit 118 and a drive unit 119. Although not shown in FIG. 3, the solid-state imaging device also includes an electronic shutter.

The photoelectric conversion region 100 has a function of converting incident light into electric charges. The photoelectric conversion region 100 includes photodiodes 101 arranged in a matrix form, vertical CCDs 103 each disposed at a left side of the photodiode 101 to serve as a vertical charge transfer path, transfer gates 102 each connecting between the photodiode 101 and the vertical CCD 103 at the left side of the photodiode 101, and a horizontal CCD 104. The horizontal CCD 104 is disposed on a lower ends of the vertical CCDs 103 to serve as a horizontal charge transfer path for transferring electric charges transferred from each vertical CCD 103 to the output unit 108.

The output unit 108 converts the electric charges transferred from the horizontal CCD 104 into a voltage value corresponding to the electric charges, and then outputs the voltage value to the A/D conversion unit 109. The A/D conversion unit 109 converts the analog voltage value received from the output unit 108 into a digital value. In accordance with a command from the control unit 117, the selection unit 110 selects the first memory 111, the second memory 112 or the addition unit 113, to which the value obtained through the conversion by the A/D conversion unit 109 is to be transferred. Each of the first memory 111 and the second memory 112 stores therein the value obtained through the conversion by the A/D conversion unit 109. The addition unit 113 adds the value transferred from the selection unit 110 and the value stored in the first memory 111. The equalization unit 114 equalizes a value obtained through the addition by the addition unit 113. Specifically, the equalization unit 114 divides the value obtained through the addition by the addition unit 113 into equal halves. The gain correction unit 115 multiplies a value obtained through the equalization by the equalization unit 114 by a predetermined coefficient, thereby performing gain correction. The subtraction unit 116 subtracts a value obtained through the gain correction by the gain correction unit 115 from the value stored in the second memory 112. The control unit 117 controls operations of the photoelectric conversion region 100, the output unit 108, the A/D conversion unit 109, the selection unit 110, the first memory 111, the second memory 112, the addition unit 113, the equalization unit 114, the gain correction unit 115, the subtraction unit 116 and the output unit 118. The output unit 118 outputs a value obtained through the subtraction by the subtraction unit 116 externally from the solid-state imaging device. The drive unit 119 drives the control unit 117 based on a drive signal received externally from the solid-state imaging device.

With regard to the solid-state imaging device according to the first embodiment, next, an operation is described.

Figure 4:
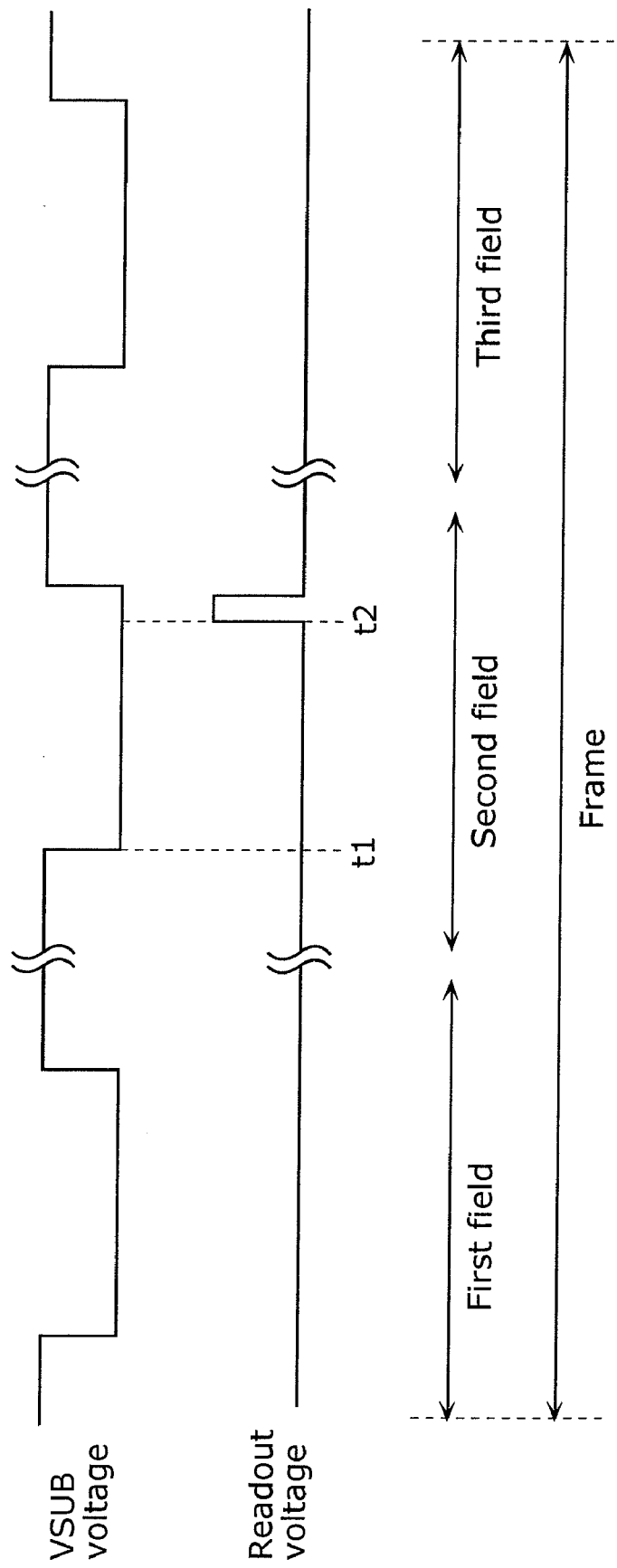
FIG. 4 shows pulse waveforms of a VSUB voltage and a readout voltage in a first field, a second field and a third field forming one frame, in the first embodiment.

In the first embodiment, one frame includes temporally-successive three fields. Herein, the term "frame" denotes a period for acquisition of one image corresponding to incident light, and the term "fields" denotes periods included in one frame. For each pixel, electric charges which cause smear and are obtained from incident light, that is, smear charges are acquired in the first field and the third field. On the other hand, for each pixel, electric charges which correspond to the incident light, that is, signal charges and smear charges are acquired in the second field. FIG. 4 shows pulse waveforms of a VSUB voltage for control of the electronic shutter and a readout voltage in the respective periods of the first field, the second field and the third field forming one frame. It is assumed herein that an electronic shutter stop starting time is t1 and a readout starting time is t2 in the second field.

As shown in FIG. 4, no readout pulse for reading electric charges from the photodiode 101 to the vertical CCD 103 is applied in the first field and the third field. Thus, electronic charges accumulated in correspondence with incident light are not transferred to the vertical CCD 103 through the transfer gate 102, but smear charges are transferred to the vertical CCD 103. On the other hand, a readout pulse for reading electric charges from the photodiode 101 to the vertical CCD 103 is applied in the second field, so that signal charges and smear charges accumulated during a period from the electronic shutter stop starting time t1 to the readout starting time t2 are read out.

It is assumed herein that an amount of the smear charges read out in the first field is N1, an amount of the signal charges read out in the second field is S2, an amount of the smear charges read out in the second field is N2 and an amount of the smear charges read out in the third field is N3. A temporal change in smear charges is locally linear in a short time. Therefore, the following relationship is established with respect to the amounts N1 to N3 of the smear charges.

$$(N1+N3)/2 \approx N2 \qquad (1)$$

Specifically, an amount obtained through equalization of the amount N1 of the smear charges read out in the first field and the amount N2 of the smear charges read out in the third field is almost equal to the amount N2 of the smear charges read out in the second field.

Moreover, the following relationship is established with respect to the amount S2 of the signal charges read out in the second field and the amount N2 of the smear charges read out in the second field, on the basis of the aforementioned expression (1).

$$S2 \approx S2+N2-(N1+N3)/2 \qquad (2)$$

Specifically, by subtraction of a value obtained through equalization of a signal read out in the first field and a signal read out in the third field from signals (S2+N2) read out in the second field, it is possible to extract signal charges S2 with an influence of smear charges eliminated therefrom.

Figure 5:
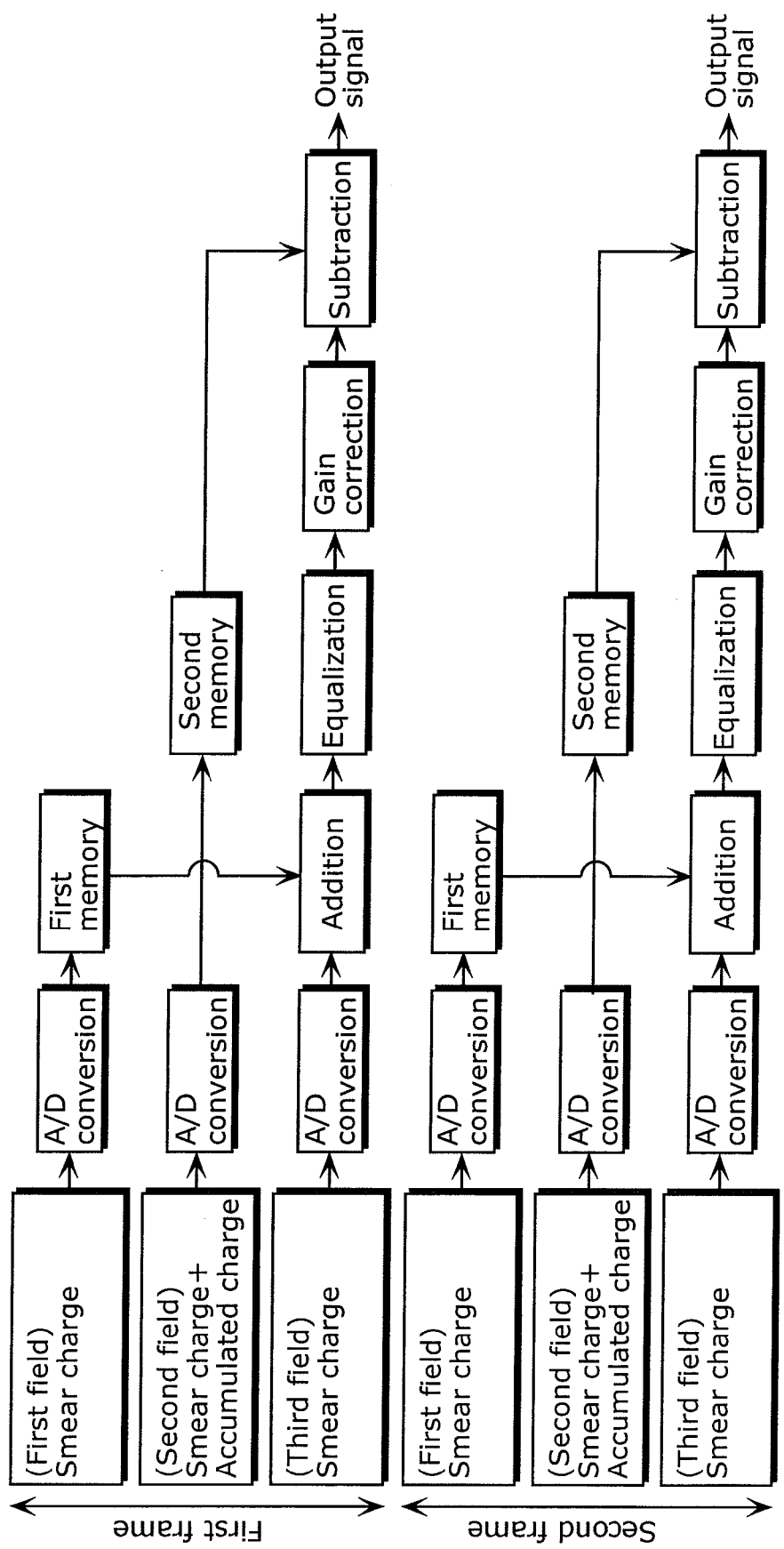
FIG. 5 shows a chart of an operating procedure of the solid-state imaging device according to the first embodiment.

FIG. 5 shows a chart of an operating procedure of the solid-state imaging device according to the first embodiment.

For each pixel, in the first field, first smear charges generated in the photodiodes 101 forming the photoelectric conversion region (solid-state imaging element) 100 are transferred to the vertical CCDs 103, the horizontal CCD 104 and the output unit 108 in this order. The output unit 108 converts the smear charges transferred from the horizontal CCD 104 into a voltage value corresponding to the electric charges, and then outputs the voltage value to the A/D conversion unit 109. The A/D conversion unit 109 converts the value received from the output unit 108, that is, the analog voltage value corresponding to the smear charges in the first field into a digital value. The first memory 111 stores therein the digital value (the value corresponding to the first smear charges) obtained through the conversion by the A/D conversion unit 109.

In the second field, the photodiodes 101 forming the photoelectric conversion region (solid-state imaging element) 100 accumulates therein electric charges in accordance with an amount of incident light during a period from the electronic shutter stop starting time t1 to the readout starting time t2. The photodiodes 101 transfer the accumulated electric charges to the vertical CCDs 103 through the transfer gates 102. Further, the vertical CCDs 103 transfers the electric charges to the horizontal CCD 104. Then, the horizontal CCD 104 transfers the electric charges to the output unit 108. The output unit 108 converts the electric charges transferred from the horizontal CCD 104 into a voltage value corresponding to the electric charges, and then outputs the voltage value to the A/D conversion unit 109. The A/D conversion unit 109 converts the value received from the output unit 108, that is, the analog voltage value corresponding to the electric charges (signal charges and smear charges) accumulated in the second field into a digital value. The second memory 112 stores therein the digital value obtained through the conversion by the A/D conversion unit 109.

In the third field, second smear charges generated in the photodiodes 101 forming the photoelectric conversion region (solid-state imaging element) 100 are transferred to the vertical CCDs 103, the horizontal CCD 104 and the output unit 108 in this order. The output unit 108 converts the smear charges transferred from the horizontal CCD 104 into a voltage value corresponding to the electric charges, and then outputs the voltage value to the A/D conversion unit 109. The A/D conversion unit 109 converts the value received from the output unit 108, that is, the analog voltage value corresponding to the smear charges in the third field into a digital value. The addition unit 113 adds the value obtained through the conversion by the A/D conversion unit 109, that is, the value corresponding to the smear charges in the third field (the value corresponding to the second smear charges) to the value stored in the first memory 111 (the value corresponding to the first smear charges) to calculate a value corresponding to third smear charges. The equalization unit 114 equalizes the value which is obtained through the addition by the addition unit 113 and corresponds to the third smear charges. In other words, the equalization unit 114 finds an average value of the first smear charges read out in the first field and the second smear charges read out in the third field. The gain correction unit 115 multiplies the value obtained through the equalization by the equalization unit 114 by a predetermined coefficient, thereby performing gain correction. The subtraction unit 116 subtracts the value obtained through the gain correction performed on the average value of the smear charges read out in the first field and the smear charges read out in the third field by the gain correction unit 115 from the value corresponding to the signal charges and the smear charges stored in the second memory 112 and read out in the second field. The output unit 118 outputs a value obtained through the subtraction by the subtraction unit 116 externally from the solid-state imaging device.

In the first embodiment, as described above, equalization is performed on the smear charges (the third smear charges), that is, a sum of the first smear charges read out in the first field and the second smear charges read out in the third field. Then, by subtraction of the equalized third smear charges from the signal charges accumulated in the second field, signal charges in one frame are obtained. A temporal change in smear charges is locally linear in a short time. Accordingly, the value obtained through the equalization of the first smear charges and the second smear charges becomes almost equal to the smear charges contained in the signal charges read out in the second field. Therefore, by the subtraction of the equalized third smear charges from the signal charges accumulated in the second field, an influence of the smear charges can be suppressed. Thus, it is possible to suppress occurrence of black level depression caused by a difference with effective electric charges causing smear due to a temporal difference, compared to the conventional technique disclosed in Japanese Unexamined Patent Application Publication No. 2001-119629. Also in the first embodiment, both signal charges and smear charges and only smear charges are read out from the same pixel at different timings. Thus, it is possible to suppress occurrence of black level depression caused by a difference with effective electric charges causing smear due to a difference between pixels, unlike the conventional technique disclosed in Japanese Unexamined Patent Application Publication No. 2005-328212. That is, the solid-state imaging device according to the first embodiment of the present invention can reduce a difference between electric charges which cause smear and are used in a subtraction process and effective electric charges which cause smear.

Moreover, a transfer speed of the vertical CCD 103 in the first and third fields may be made higher than a transfer speed of the vertical CCD 103 in the second field. Both signal charges and smear charges are transferred in the second field, whereas only smear charges are transferred in the first and third fields. More specifically, an amount of electric charges to be transferred in the first and third fields is smaller than an amount of electric charges to be transferred in the second field. Accordingly, there occurs no transfer failure even when the transfer speed of the vertical CCD 103 in the first and third fields is made higher than the transfer speed of the vertical CCD 103 in the second field. Thus, it is possible to improve a readout speed of the solid-state imaging device. When the transfer speed of the vertical CCD 103 in the second field differs from the transfer speed of the vertical CCD 103 in the first and third fields, an average value of the smear charges read out in the first field and the smear charges read out in the third field and a value of the smear charges read out in the second field vary in proportion to the transfer speeds, respectively. The gain correction unit 115 multiplies the equalized value by a coefficient based on a ratio of the transfer speed of the vertical CCD 103 in the first and third fields and the transfer speed of the vertical CCD 103 in the second field. As a result, a value obtained through the multiplication by the gain correction unit 115 can be corrected so as to be equal to the smear charges read out in the second field. In the case where the transfer speeds of the vertical CCD 103 in the first, second and third fields are equal to each other, the subtraction unit 116 may subtract the value obtained through the equalization by the equalization unit 114 from the value stored in the second memory 112 without providing the gain correction unit 115.

Second Embodiment

The second embodiment of the present invention describes a configuration that one frame includes two fields.

A solid-state imaging device according to the second embodiment is similar in structure to the solid-state imaging device according to the first embodiment. Therefore, detailed description of the structure will not be given here.

With regard to the solid-state imaging device according to the second embodiment, hereinafter, an operation is described.

Figure 6:
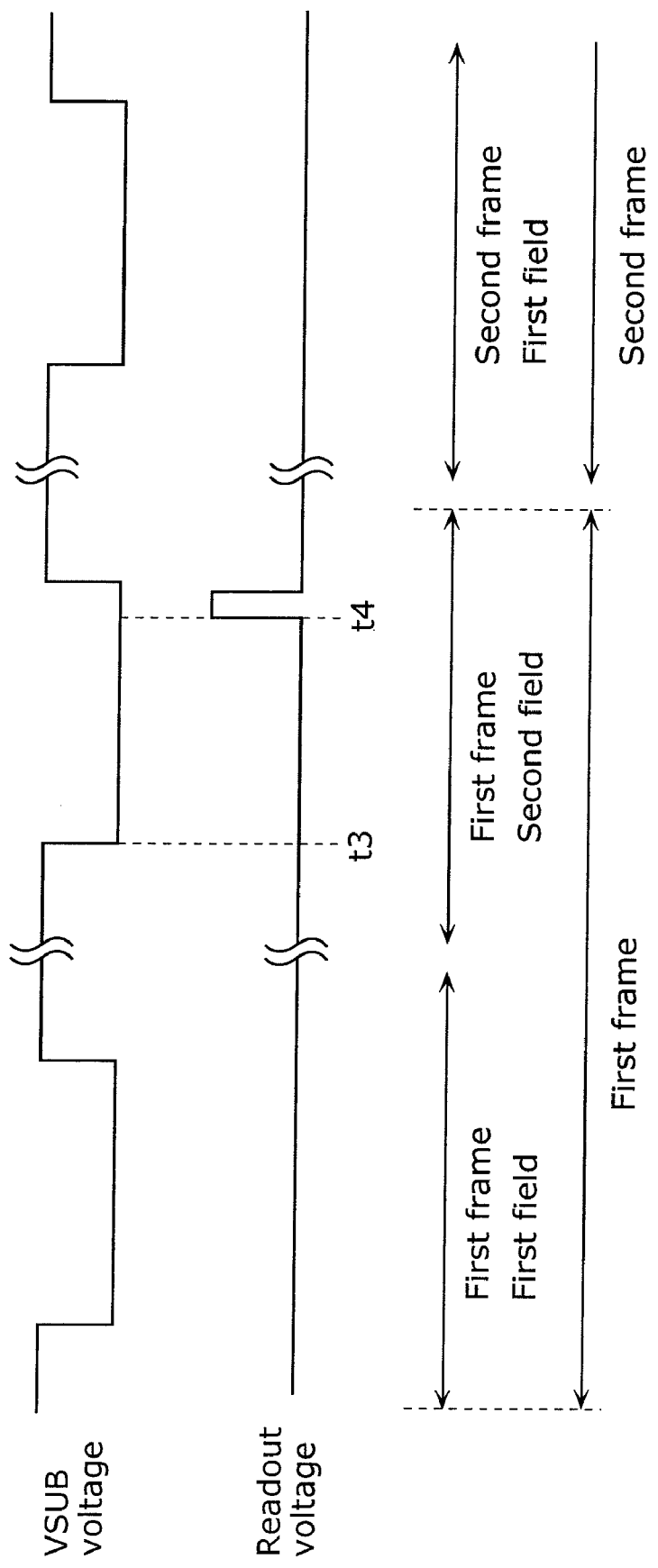
FIG. 6 shows pulse waveforms of a VSUB voltage and a readout voltage in a first field of a first frame, a second field of the first frame and the first field of the first frame, in a second embodiment of the present invention.

In the second embodiment, one frame includes two fields. Electric charges which cause smear and are obtained from incident light, that is, smear charges are read out in the first field. On the other hand, electric charges which correspond to the incident light, that is, signal charges and smear charges are read out in the second field. FIG. 6 shows pulse waveforms of a VSUB voltage for control of an electronic shutter and a readout voltage in the first field and the second field forming one frame. It is assumed herein that an electronic shutter stop starting time is t3 and a readout starting time is t4 in the second field of the first frame. The first frame and the second frame are temporally successive. The first frame appears earlier in time than the second frame.

As shown in FIG. 6, no readout pulse for reading electric charges from a photodiode 101 to a vertical CCD 103 is applied in the first fields of the first and second frames. Thus, electronic charges accumulated in correspondence with incident light are not transferred to the vertical CCD 103 through a transfer gate 102, but only smear charges are read out by the vertical CCD 103. On the other hand, a readout pulse is applied in the second field of the first frame, so that signal charges and smear charges accumulated during a period from the electronic shutter stop starting time t3 to the readout starting time t4 are read out.

It is assumed herein that an amount of the smear charges read out in the first field of the first frame is N11, an amount of the signal charges read out in the second field of the first frame is S12, an amount of the smear charges read out in the second field of the first frame is N12 and an amount of the smear charges read out in the first field of the second frame is N21. A temporal change in smear charges is locally linear in a short time. Therefore, the following relationship is established with respect to the amounts N11, N12 and N21 of the smear charges.

$$(N11+N21)/2 \cong N12 \qquad (3)$$

Specifically, an amount obtained through equalization of the amount N11 of the smear charges read out in the first field of the first frame and the amount N21 of the smear charges read out in the first field of the second frame is almost equal to the amount N12 of the smear charges read out in the second field of the first frame.

Moreover, the following relationship is established with respect to the amount S12 of the signal charges read out in the second field and the amount N12 of the smear charges read out in the second field, on the basis of the aforementioned expression (3).

$$S12 \cong S12 + N12 - (N11+N21)/2 \qquad (4)$$

Specifically, by subtraction of a value obtained through equalization of a signal read out in the first field of the first frame and a signal read out in the second field of the second frame from signals (S12+N12) read out in the second field of the first frame, it is possible to extract signal charges with an influence of smear charges eliminated therefrom.

Figure 7:
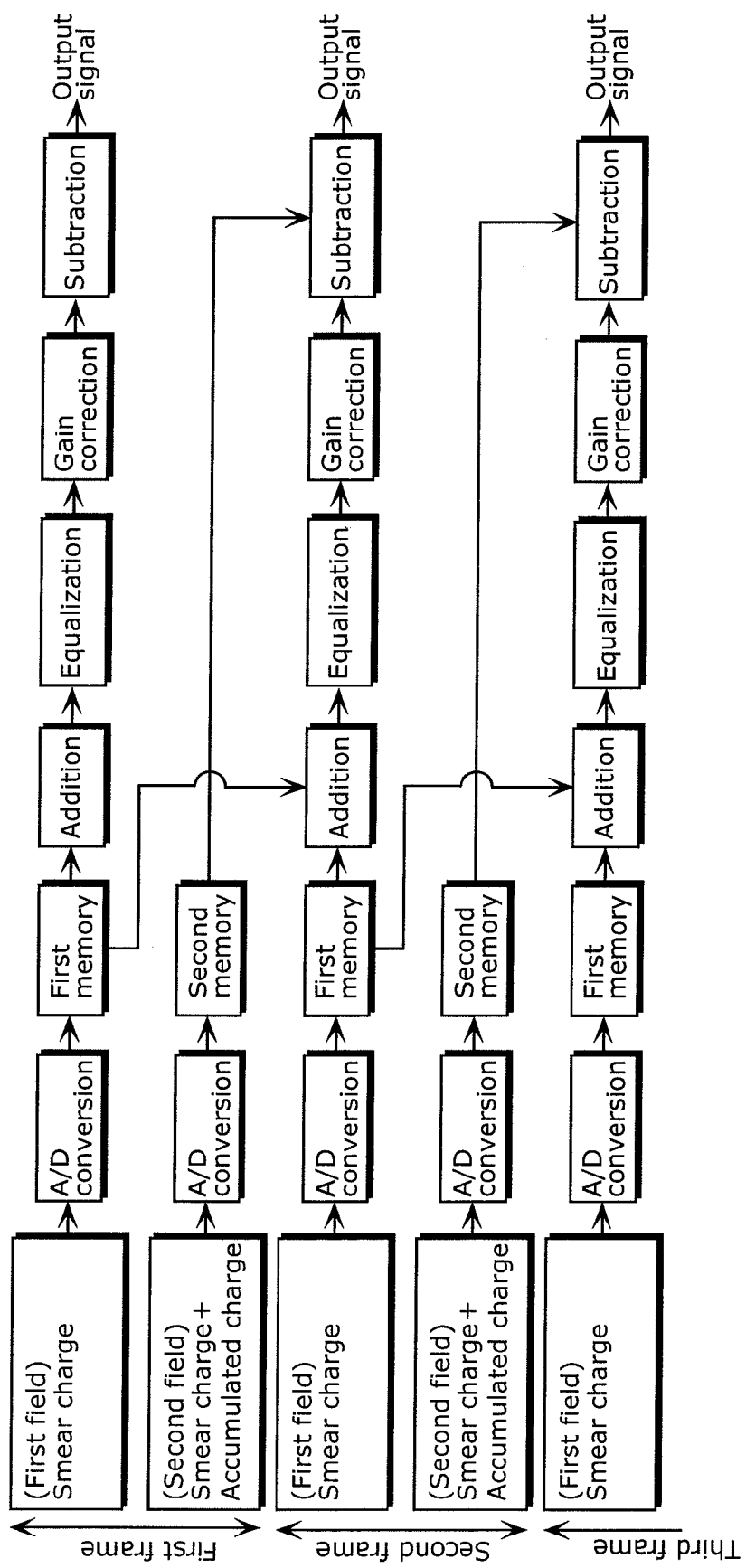
FIG. 7 shows a chart of an operating procedure of a solid-state imaging device according to the second embodiment.

FIG. 7 shows a chart of an operating procedure of the solid-state imaging device according to the second embodiment.

For each pixel, in the first field of the first frame, a solid-state imaging element 100 reads out first smear charges, and then transfers the first smear charges to an output unit 108. The output unit 108 converts the smear charges transferred from the solid-state imaging element 100 into a voltage value corresponding to the electric charges, and then outputs the voltage value to an A/D conversion unit 109. The A/D conversion unit 109 converts the value received from the output unit 108, that is, the analog voltage value corresponding to the smear charges in the first field of the first frame into a digital value. A first memory 111 stores therein the digital value obtained through the conversion by the A/D conversion unit 109 (the value corresponding to the first smear charges).

In the second field of the first frame, the solid-state imaging element 100 accumulates therein electric charges in accordance with an amount of incident light during a period from time t3 to time t4. A horizontal CCD 104 transfers the electric charges accumulated in the solid-state imaging element 100 to the output unit 108. The output unit 108 converts the electric charges transferred from the horizontal CCD 104 into a voltage value corresponding to the electric charges, and then outputs the voltage value to the A/D conversion unit 109. The A/D conversion unit 109 converts the value received from the output unit 108, that is, the analog voltage value corresponding to the electric charges accumulated in the second field of the first frame into a digital value. A second memory 112 stores therein the digital value obtained through the conversion by the A/D conversion unit 109.

In the first field of the second frame, the solid-state imaging element 100 reads out second smear charges, and then transfers the second smear charges to the output unit 108. The output unit 108 converts the smear charges transferred from the solid-state imaging element 100 into a voltage value corresponding to the electric charges, and then outputs the voltage value to the A/D conversion unit 109. The A/D conversion unit 109 converts the value received from the output unit 108, that is, the analog voltage value corresponding to the smear charges in the first field of the second frame into a digital value. An addition unit 113 adds the value obtained through the conversion by the A/D conversion unit 109, that is, the value corresponding to the smear charges in the first field of the second frame (the value corresponding to the second smear charges) to the value stored in the first memory 111 (the value corresponding to the first smear charges) to calculate a value corresponding to third smear charges. An equalization unit 114 equalizes the value which is obtained through the addition by the addition unit 113 and corresponds to the third smear charges. In other words, the equalization unit 114 finds an average value of the first smear charges read out in the first field of the first frame and the second smear charges read out in the first field of the second frame. A gain correction unit 115 multiplies the value obtained through the equalization by the equalization unit 114 by a predetermined coefficient, thereby performing gain correction. A subtraction unit 116 subtracts the value obtained through the gain correction performed on the average value of the smear charges read out in the first field of the first frame and the smear charges read out in the first field of the second frame by the gain correction unit 115 from the value corresponding to the signal charges and the smear charges stored in the second memory 112 and read out in the second field of the first frame. The output unit 118 outputs a value obtained through the subtraction by the subtraction unit 116 externally from the solid-state imaging device.

In the second embodiment, as described above, equalization is performed on the smear charges (the third smear charges), that is, a sum of the first smear charges read out in the first field of the first frame and the second smear charges read out in the first field of the second frame. Then, by subtraction of the equalized third smear charges from the signal charges accumulated in the second field of the first frame, signal charges in one frame are obtained. A temporal change in smear charges is locally linear in a short time. Accordingly, the value obtained through the equalization of the first smear charges and the second smear charges becomes almost equal to the smear charges contained in the signal charges read out in the second field of the first frame. Therefore, by the subtraction of the equalized third smear charges from the signal charges accumulated in the second field, an influence of the smear charges can be suppressed. Thus, it is possible to suppress occurrence of black level depression caused by a difference with effective electric charges causing smear due to a temporal difference, unlike the conventional technique disclosed in Japanese Unexamined Patent Application Publication No. 2001-119629. Also in the second embodiment, both signal charges and smear charges and only smear charges are read out from the same pixel at different timings. Thus, it is possible to suppress occurrence of black level depression caused by a difference with effective electric charges causing smear due to a difference between pixels, unlike the conventional technique disclosed in Japanese Unexamined Patent Application Publication No. 2005-328212.

Unlike the first embodiment, further, a special third field is not provided in the second embodiment. According to the second embodiment, therefore, the aforementioned advantages can be attained by the operations using a normal frame method, leading to facilitation of a drive circuit configuration. Unlike the first embodiment, additionally, one frame includes two fields in the second embodiment. According to the second embodiment, therefore, the respective units can be readily operated at a high speed.

Third Embodiment

In the first and second embodiments, only smear charges or both signal charges and smear charges are read out from all pixels simultaneously in each field. On the other hand, in the third embodiment of the present invention, only smear charges are read out from certain pixels whereas both signal charges and smear charges are read out from other pixels in each field. Hereinafter, a solid-state imaging device having such configuration is described.

Figure 8:
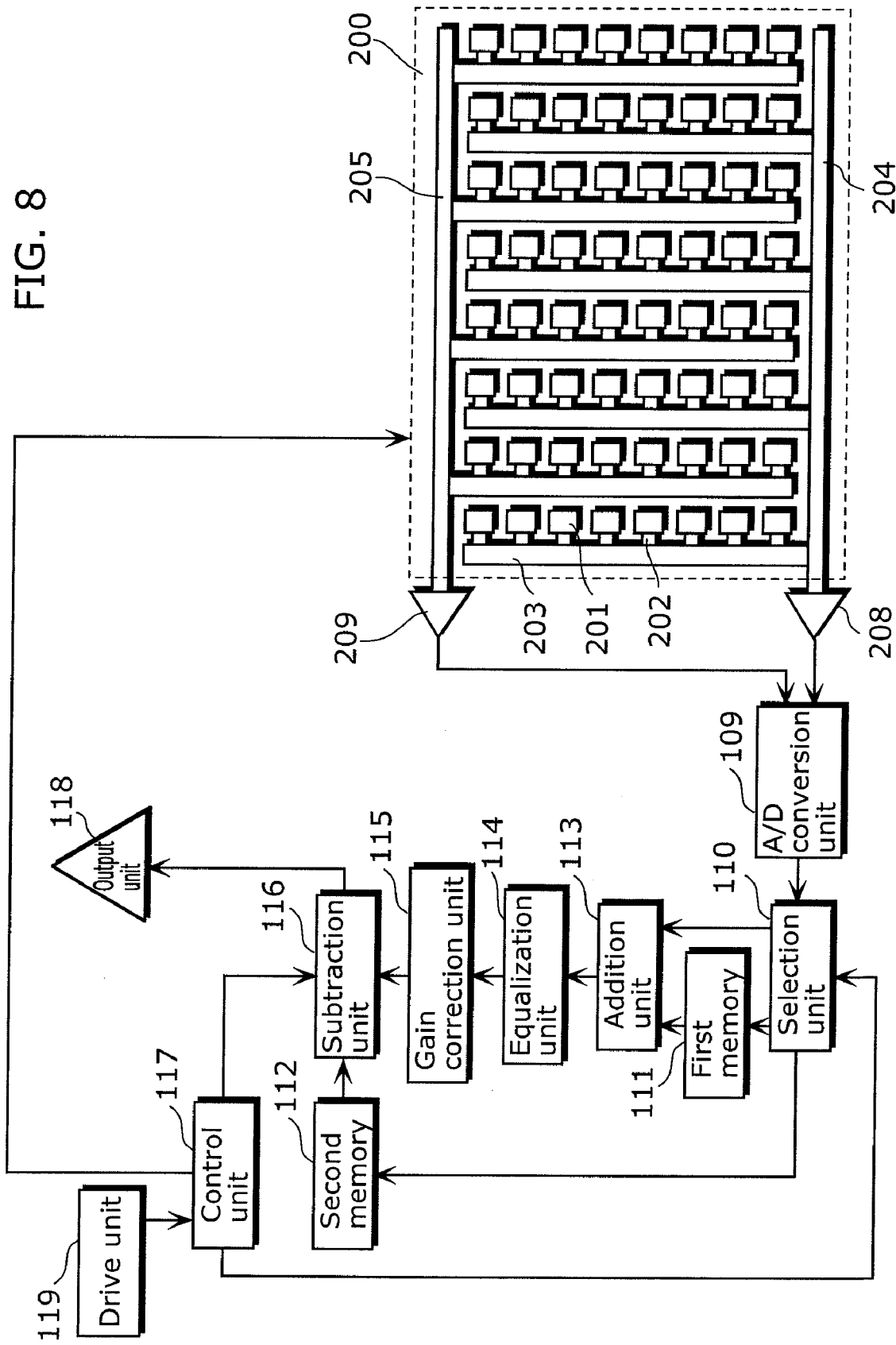
FIG. 8 shows a structure of a solid-state imaging device according to a third embodiment of the present invention.

FIG. 8 shows a structure of the solid-state imaging device according to the third embodiment. The solid-state imaging device according to the third embodiment includes a photoelectric conversion region (solid-state imaging element) 200, output units 208 and 209, an A/D conversion unit 109, a selection unit 110, a first memory 111, a second memory 112, an addition unit 113, an equalization unit 114, a gain correction unit 115, a subtraction unit 116, a control unit 117, an output unit 118 and a drive unit 119. Although not shown in FIG. 8, the solid-state imaging device also includes an electronic shutter. In FIG. 8, the constituent elements similar to those shown in FIG. 3 are denoted by identical reference numerals to those in FIG. 3; therefore, detailed description thereof will not be given here.

The photoelectric conversion region 200 has a function of converting incident light into electric charges. The photoelectric conversion region 200 includes photodiodes 201 arranged in a matrix form, vertical CCDs 203 each disposed at a left side of the photodiode 201 to serve as a vertical charge transfer path, transfer gates 202 each connecting between the photodiode 201 and the vertical CCD 203 at the left side of the photodiode 101, a first horizontal CCD 204, and a second horizontal CCD 205. The vertical CCD 203 in an even column (in the case where a leftmost column is regarded as a zeroth column in FIG. 8) transfers electric charges transferred from the photodiode 201 in the even column downward in a vertical direction. On the other hand, the vertical CCD 203 in an odd column (in the case where the leftmost column is regarded as the zeroth column in FIG. 8) transfers electric charges transferred from the photodiode 201 in the odd column upward in the vertical direction. The first horizontal CCD 204 is disposed on a lower end of the vertical CCD 203 to serve as a horizontal charge transfer path for transferring the electric charges transferred from the vertical CCD 203 in the even column to the output unit 208 in a horizontal direction. The second horizontal CCD 205 is disposed on an upper end of the vertical CCD 203 to serve as a horizontal charge transfer path for transferring the electric charges transferred from the vertical CCD 203 in the odd column to the output unit 209 in the horizontal direction.

The output unit 208 converts the electric charges transferred from the horizontal CCD 204 into a voltage value corresponding to the electric charges, and then outputs the voltage value to the A/D conversion unit 109. The output unit 209 converts the electric charges transferred from the horizontal CCD 205 into a voltage value corresponding to the electric charges, and then outputs the voltage value to the A/D conversion unit 109.

With regard to the solid-state imaging device according to the third embodiment, next, an operation is described.

In the third embodiment, one frame includes two fields as in the second embodiment. Also in the third embodiment, from first pixels included in the photodiodes 201, electric charges which cause smear, that is, smear charges are read out in the first field whereas electric charges which correspond to incident light, that is, signal charges and smear charges are read out in the second field. On the other hand, from second pixels other than the first pixels included in the plurality of photodiodes 201, electric charges which correspond to incident light, that is, signal charges and electric charges which cause smear, that is, smear charges are read out in the first field whereas smear charges are read out in the second field.

In the first field, no readout pulse for reading electric charges from each of the first pixels is applied. Thus, electric charges accumulated in correspondence with incident light are not transferred to the vertical CCD 203 through the transfer gate 202, but only smear charges are transferred to the vertical CCD 203. On the other hand, in the second field, a readout pulse for reading electric charges from each of the first pixels is applied, so that signal charges and smear charges accumulated during a period from an electronic shutter stop starting time to a readout starting time are read out from each of the first pixels. In the first field, a readout pulse for reading electric charges from each of the second pixels is applied, so that signal charges and smear charges accumulated during the period from the electronic shutter stop starting time to the readout starting time are read out from each of the second pixels. On the other hand, in the second field, no readout pulse for reading electric charges from each of the second pixels is applied. Thus, the electric charges accumulated in correspondence with the incident light are not transferred to the vertical CCD 203 through the transfer gate 202, but only the smear charges are transferred to the vertical CCD 203.

Figure 9:
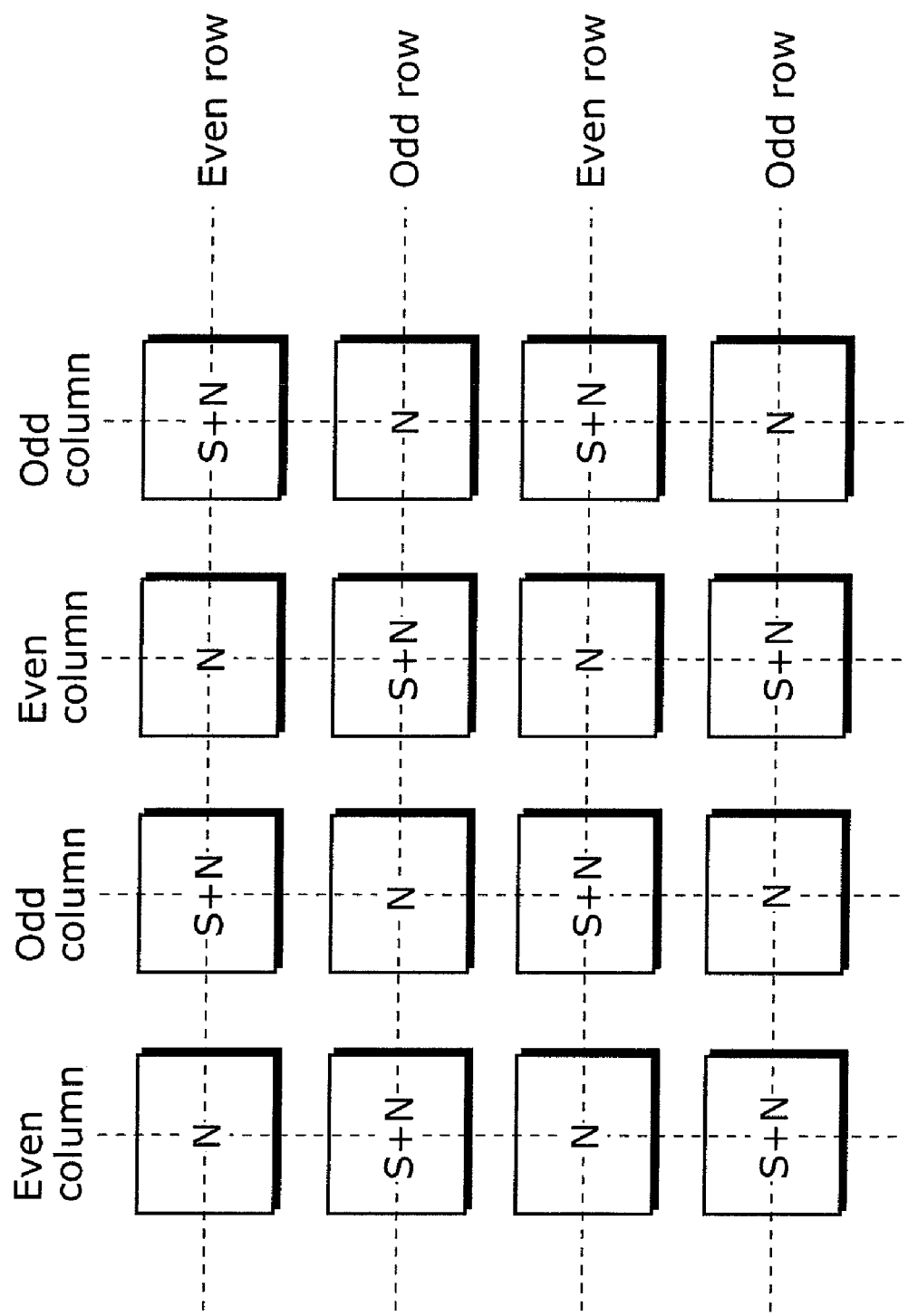
FIG. 9 shows a layout of pixels from which only smear charges are read out or both accumulated charges and smear charges are readout in a first field, in the third embodiment.

FIG. 9 shows a layout of pixels from which only smear charges are read out or both accumulated charges and smear charges are readout in the first field. In FIG. 9, pixels denoted by "N" are pixels (first pixels) from which only smear charges are read out in the first field, and pixels denoted by "S+N" are pixels (second pixels) from which both accumulated charges and smear charges are read out in the first field. As shown in FIG. 9, in the first field, only smear charges are read out from pixels in even columns and even rows and pixels in odd columns and odd rows whereas both accumulated charges and smear charges are read out from pixels in the even columns and the odd rows and pixels in the odd columns and the even rows. That is, the first pixels and the second pixels are arranged alternately in the row direction and the column direction.

Figure 10:
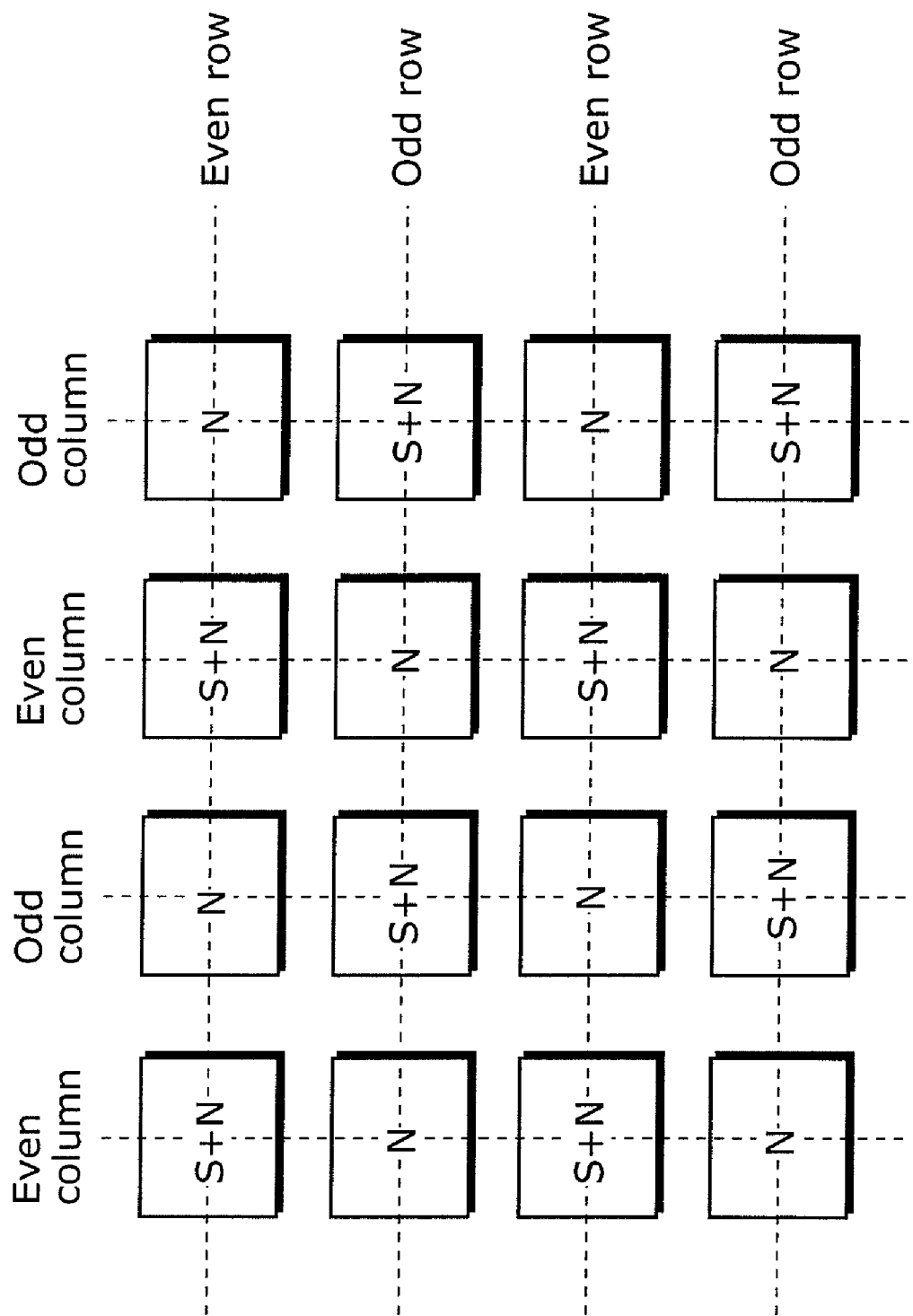
FIG. 10 shows a layout of pixels from which only smear charges are read out or both accumulated charges and smear charges are read out in a second field, in the third embodiment.

FIG. 10 shows a layout of pixels from which only smear charges are read out or both accumulated charges and smear charges are read out in the second field. As shown in FIG. 10, in the second field, both accumulated charges and smear charges are read out from pixels in even columns and even rows and pixels in an odd column and an odd row whereas only smear charges are read out from a pixel in the even column and the odd row and a pixel in the odd column and the even row, contrary to the first field.

Figure 11A:
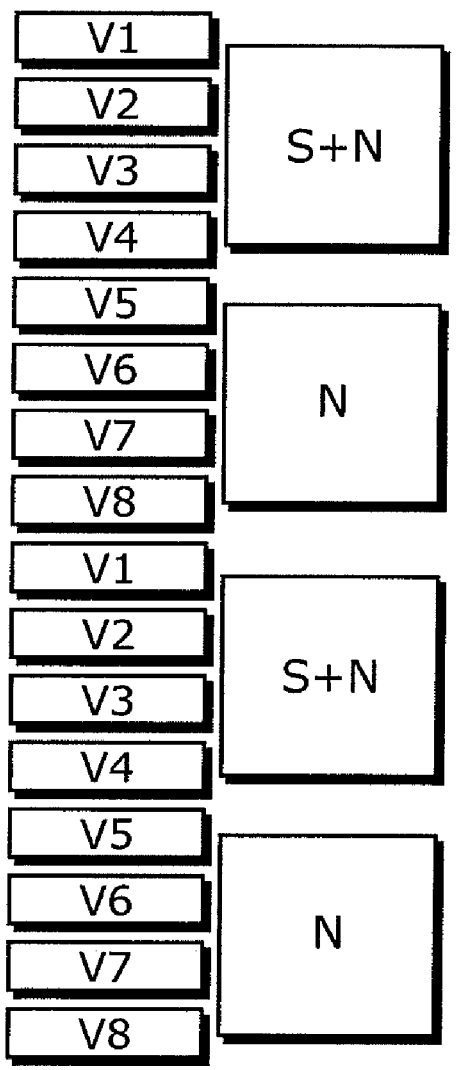
FIGS. 11A and 11B show examples of electrodes of a vertical CCD in the third embodiment.
Figure 11B:
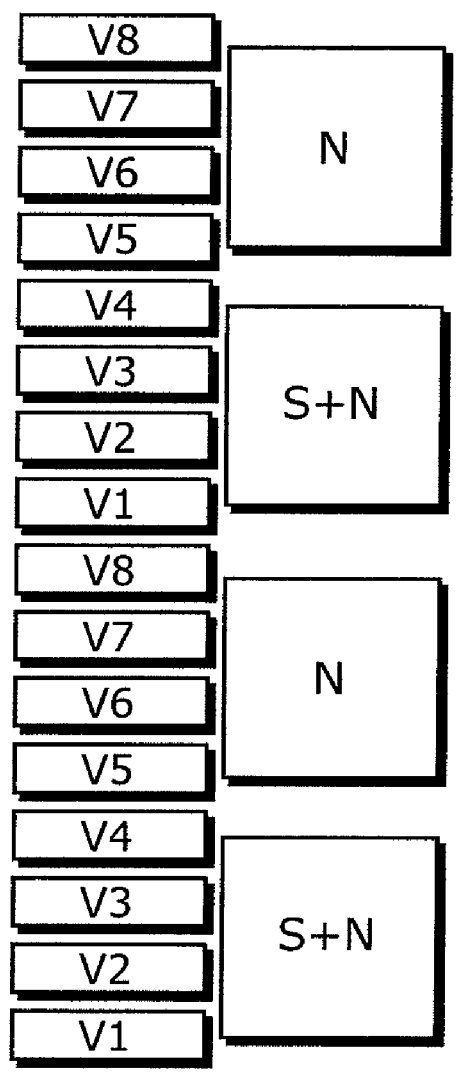

FIGS. 11A and 11B show examples of electrodes of a vertical CCD. More specifically, FIG. 11A shows structure of electrodes of the vertical CCD in the even columns shown in FIG. 10. FIG. 11B shows structure of electrodes of the vertical CCD in the odd columns shown in FIG. 10. As shown in FIGS. 11A and 11B, for example, the vertical CCD 203 is an eight-phase vertical CCD which is repetitive with respect to two pixels. In addition, an arrangement order of electrodes in the even column is the inverse of an arrangement order of electrodes in the odd column. With this structure, it is possible to perform downward vertical transfer in the even column and upward vertical transfer in the odd column by use of a common control signals.

Figure 12:
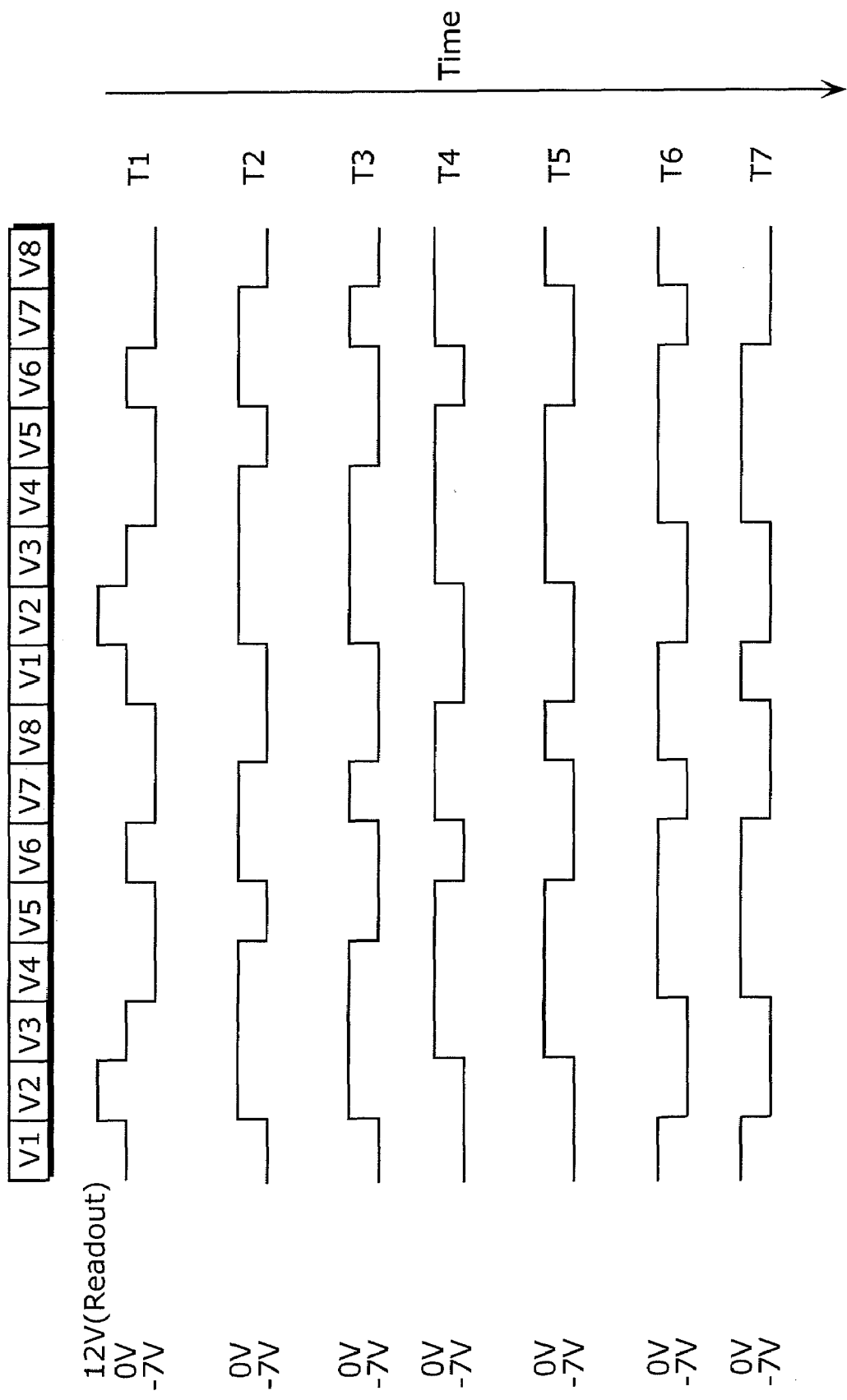
FIG. 12 shows a timing chart of signals applied to the electrodes of the vertical CCDs in the third embodiment.

FIG. 12 shows a timing chart of signals applied to the electrodes of the vertical CCDs shown in FIGS. 11A and 11B. As shown in FIG. 12, at a time T1, a readout voltage (12 V) is applied to an electrode V2, so electric charges and smear charges accumulated in the photodiode that 201 are transferred to the vertical CCD 203. Also at the time T1, no readout voltage (12 V) is applied to an electrode V6, so that smear charges are transferred to the vertical CCD 203. At times T2 to T7, both accumulated charges and smear charges and only smear charges are transferred sequentially by application of voltages shown in FIG. 12.

Herein, an amount of the signal charges, that is, a sum of the accumulated charges and the smear charges is larger than an amount of signal charges, that is, only the smear charges. Accordingly, when a width of a potential well in a vertical transfer direction for use in transfer of only smear charges by a vertical CCD is made narrower than a width of a potential well in a vertical transfer direction for use in transfer of both accumulated charges and smear charges by a vertical CCD, a maximum amount of electric charges to be transferred to the vertical CCD 203 can be made large. As shown in FIG. 12, for example, a region corresponding to three electrodes is used for transfer of signal charges, that is, a sum of accumulated charges and smear charges, and a region corresponding to one or two electrode(s) is used for transfer of signal charges, that is, only smear charges.

Figure 13:
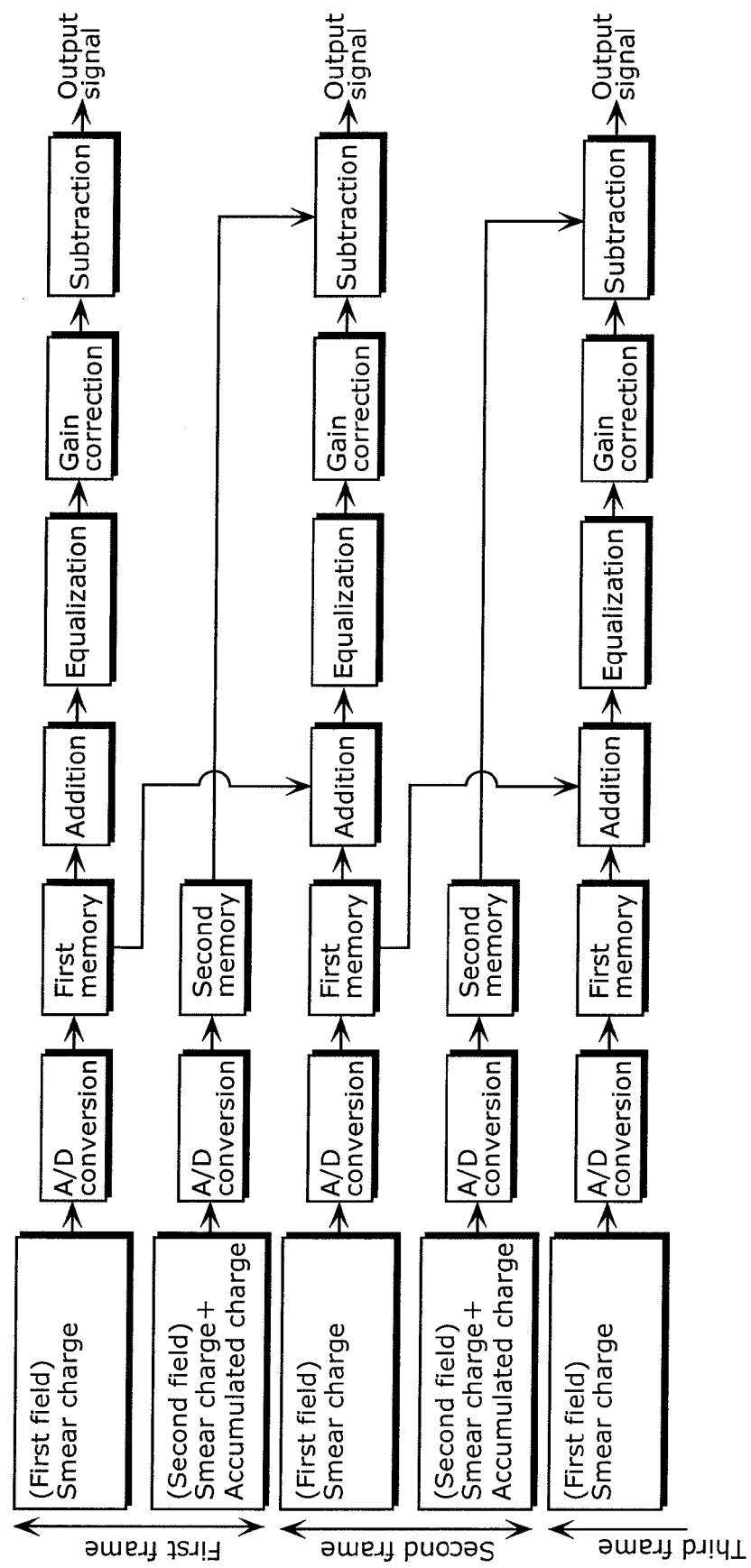
FIG. 13 shows a chart of an operating procedure of the solid-state imaging device according to the third embodiment, for a first pixel.

FIG. 13 shows a chart of an operating procedure of the solid-state imaging device according to the third embodiment, for the first pixels (the pixels in the even columns and the even rows and the pixels in the odd columns and the odd rows).

For each of the first pixels, in the first field of the first frame, the solid-state imaging element 200 reads out first smear charges from the first pixel, and then transfers the first smear charges to the output unit 208 or 209. Each of the output units 208 and 209 converts the smear charges transferred from the solid-state imaging element 200 into a voltage value corresponding to the electric charges, and then outputs the voltage value to the A/D conversion unit 109. The A/D conversion unit 109 converts the value received from each of the output units 208 and 209, that is, the analog voltage value corresponding to the smear charges of the first pixels in the first field of the first frame into a digital value. The first memory 111 stores therein the digital value obtained through the conversion by the A/D conversion unit 109 (the value corresponding to the first smear charges).

In the second field of the first frame, the first pixels in the solid-state imaging element 200 accumulate therein electric charges in accordance with an amount of incident light. The horizontal CCDs 204 and 205 transfer the first electric charges accumulated in the first pixels to the output unit 208 or 209. The output units 208 and 209 convert the electric charges transferred from the horizontal CCDs 204 and 205 into voltage values corresponding to the electric charges, and then output the voltage values to the A/D conversion unit 109. The A/D conversion unit 109 converts the values received from the output units 208 and 209, that is, the analog voltage values corresponding to the electric charges of the first pixel accumulated in the second field of the first frame into digital values. The second memory 112 stores therein the digital values obtained through the conversion by the A/D conversion unit 109 (the values corresponding to the first electric charges).

In the first field of the second frame, the solid-state imaging element 200 reads out second smear charges from the first pixels, and then transfers the second smear charges to the output unit 208 or 209. Each of the output units 208 and 209 converts the smear charges transferred from the solid-state imaging element 200 into a voltage value corresponding to the electric charges, and then outputs the voltage value to the A/D conversion unit 109. The A/D conversion unit 109 converts the value received from each of the output units 208 and 209, that is, the analog voltage value corresponding to the smear charges of the first pixel in the first field of the second frame into a digital value. The addition unit 113 adds the value obtained through the conversion by the A/D conversion unit 109, that is, the value corresponding to the smear charges of the first pixel in the first field of the second frame (the value corresponding to the second smear charges) to the value stored in the first memory 111 (the value corresponding to the first smear charges) to calculate a value corresponding to third smear charges. The equalization unit 114 equalizes the value which is obtained through the addition by the addition unit 113 and corresponds to the third smear charges. In other words, the equalization unit 114 finds an average value of the first smear charges read out in the first field of the first frame and the second smear charges read out in the first field of the second frame. The gain correction unit 115 multiplies the value obtained through the equalization by the equalization unit 114 by a predetermined coefficient, thereby performing gain correction. The subtraction unit 116 subtracts the value obtained through the gain correction performed on the average value of the smear charges read out from the first pixels in the first field of the first frame and the smear charges read out from the first pixels in the first field of the second frame by the gain correction unit 115 from the value corresponding to the signal charges and the smear charges stored in the second memory 112 and read out from the first pixels in the second field of the first frame. The output unit 118 outputs a value obtained through the subtraction by the subtraction unit 116 externally from the solid-state imaging device.

Figure 14:
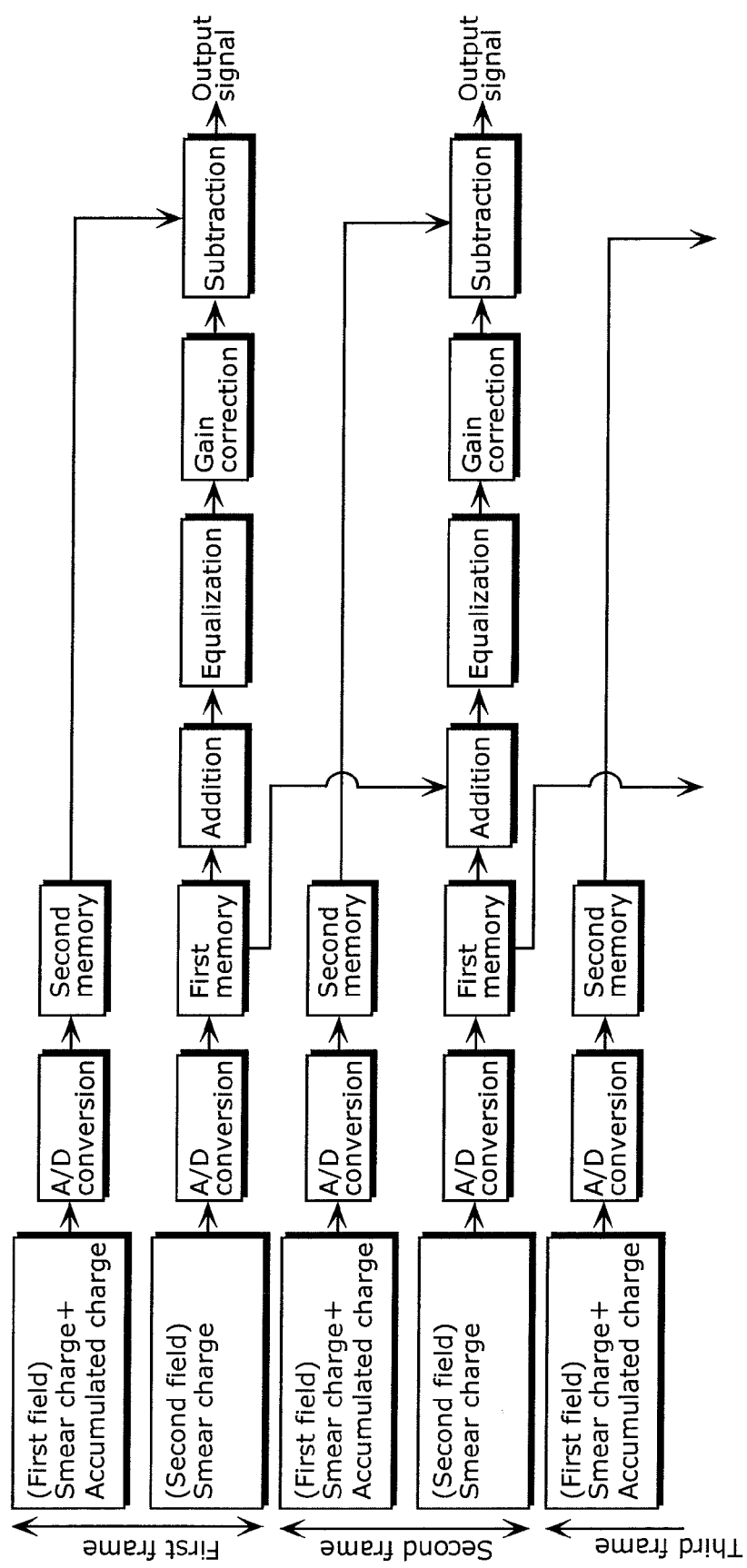
FIG. 14 shows a chart of an operating procedure of the solid-state imaging device according to the third embodiment, for a second pixel.

FIG. 14 shows a chart of an operating procedure of the solid-state imaging device according to the third embodiment, for the second pixels (the pixels in the even columns and the odd rows and the pixels in the odd columns and the even rows).

For each of the second pixels, in the second field of the first frame, the solid-state imaging element 200 reads out fourth smear charges from the second pixel, and then transfers the fourth smear charges to the output unit 208 or 209. Each of the output units 208 and 209 converts the smear charges transferred from the solid-state imaging element 200 into a voltage value corresponding to the electric charges, and then outputs the voltage value to the A/D conversion unit 109. The A/D conversion unit 109 converts the value received from each of the output units 208 and 209, that is, the analog voltage value corresponding to the smear charges of the second pixels in the first field of the first frame into a digital value. The first memory 111 stores therein the digital value obtained through the conversion by the A/D conversion unit 109 (the value corresponding to the fourth smear charges).

In the first field of the second frame, the second pixels in the solid-state imaging element 200 accumulate therein electric charges in accordance with an amount of incident light. The horizontal CCDs 204 and 205 transfer the second electric charges accumulated in the second pixels to the output unit 208 or 209. Each of the output units 208 and 209 converts the electric charges transferred from the horizontal CCDs 204 and 205 into a voltage value corresponding to the electric charges, and then outputs the voltage value to the A/D conversion unit 109. The A/D conversion unit 109 converts the value received from each of the output units 208 and 209, that is, the analog voltage value corresponding to the electric charges of the second pixel accumulated in the first field of the second frame into a digital value. The second memory 112 stores therein the digital value obtained through the conversion by the A/D conversion unit 109 (the value corresponding to the second electric charges).

In the second field of the second frame, the solid-state imaging element 200 reads out fifth smear charges from the second pixel, and then transfers the fifth smear charges to the output unit 208 or 209. Each of the output units 208 and 209 converts the smear charges transferred from the solid-state imaging element 200 into a voltage value corresponding to the electric charges, and then outputs the voltage value to the A/D conversion unit 109. The A/D conversion unit 109 converts the value received from each of the output units 208 and 209, that is, the analog voltage value corresponding to the smear charges of the second pixels in the second field of the second frame into a digital value. The addition unit 113 adds the value obtained through the conversion by the A/D conversion unit 109, that is, the value corresponding to the smear charges of the second pixels in the second field of the second frame (the value corresponding to the fifth smear charges) to the value stored in the first memory 111 (the value corresponding to the fourth smear charges) to calculate a value corresponding to sixth smear charges. The equalization unit 114 equalizes the value which is obtained through the addition by the addition unit 113 and corresponds to the sixth smear charges. In other words, the equalization unit 114 finds an average value of the fourth smear charges read out in the second field of the first frame and the fifth smear charges read out in the second field of the second frame. The gain correction unit 115 multiplies the value obtained through the equalization by the equalization unit 114 by a predetermined coefficient, thereby performing gain correction. The subtraction unit 116 subtracts the value obtained through the gain correction performed on the average value of the smear charges read out from the second pixel in the second field of the first frame and the smear charges read out from the second pixel in the second field of the second frame by the gain correction unit 115 from the value corresponding to the signal charges and the smear charges (the second electric charges) stored in the second memory 112 and read out from the second pixel in the first field of the second frame. The output unit 118 outputs a value obtained through the subtraction by the subtraction unit 116 externally from the solid-state imaging device.

In the third embodiment, as described above, only smear charges are read out from one of pixels adjoining to each other in a column direction whereas both accumulated charges and smear charges are read out from the other pixel in a predetermined field. Upon transfer of signal charges by the vertical CCD 203, further, a region for use in transfer of both accumulated charges and smear charge is made larger than a region for use in transfer of only smear charges. Thus, it is possible to attain such advantages that a maximum amount of electric charges to be transferred by the vertical CCD 203 can be increased and transfer of signal charges can be performed more efficiently, in addition to the advantages in the second embodiment.

By alternate arrangement of the first pixels and the second pixels in the column direction, transfer of only smear charges and transfer of both accumulated charges and smear charges are adjacent to each other upon transfer of electric charges by the vertical CCD 203. Thus, even when the region for use in transfer of both the accumulated charges and the smear charges is made larger than the region for use in transfer of only the smear charges, the transfer of the electric charges by the vertical CCD 203 can be controlled readily.

In the aforementioned solid-state imaging device which includes two horizontal CCDs and can perform a readout operation at a high speed, additionally, it is possible to reduce a difference between electric charges which cause smear and are used in a subtraction process and effective electric charges which cause smear.

In the aforementioned description, signals outputted from the output units 208 and 209 are transferred to one A/D conversion unit 109. Alternatively, the solid-state imaging device may include two A/D conversion units, and such signals from the output units 208 and 209 may be transferred to the two A/D conversion units, respectively. Further, the number of some of the selection unit 110, first memory 111, second memory 112, addition unit 113, equalization unit 114, gain correction unit 115 and subtraction unit 116 may be two, and values outputted from the two A/D conversion units may be processed through different processing routes, respectively. In addition, a processing route for processing of electric charges of the first pixels and a processing route for processing of electric charges of the second pixels may be provided independently of each other.

Also in the aforementioned description, the solid-state imaging element 200 includes two horizontal CCDs provided in a vertical direction. Alternatively, the solid-state imaging element may include one horizontal CCD as in the first embodiment. In this case, for example, only smear charges are read out from the pixels in the even rows whereas both accumulated charges and smear charges are read out from the pixels in the odd rows in the first field. Moreover, only smear charges are read out from the pixel in the odd rows whereas both accumulated charges and smear charges are read out from the pixel in the even rows in the second field.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

A solid-state imaging device and a driving method for the same according to the present invention are useful in a solid-state imaging device including a solid-state imaging element such as a CCD image sensor or a CMOS image sensor for use in a video camera, a digital still camera, a mobile phone camera, a camera for medical use or a surveillance camera which is excellent in quality of an output image.

What is claimed is:

1. A driving method for a solid-state imaging device which has a plurality of pixels arranged in a matrix form and uses a frame period including a field period for acquiring signal charges of the pixel and a field period for acquiring electric charges causing smear, said method comprising:
   a first holding step of holding electric charges which cause smear and are obtained from incident light in a first holding unit, in a previous field period which is one of two different field periods temporally and evenly spaced away from a predetermined field period in the frame period and appears temporally earlier, for each of first pixels included in the plurality of pixels;
   a second holding step of holding signal charges which are obtained from the incident light in a second holding unit, in the predetermined field period, for each of the first pixels;
   a first equalization step of equalizing electric charges which cause smear and are obtained from the incident light in a subsequent field period which is the other one of the two field periods and appears temporally later, and the electric charges which cause smear and are held by the first holding unit, in a subsequent field period which is the other one of the two field periods and appears temporally later, for each of the first pixels; and
   a first subtraction step of subtracting the electric charges which cause smear and are equalized in said first equalization step from the signal charges which are held by the second holding unit, for each of the first pixels.

2. The driving method for the solid-state imaging device according to claim 1,
   wherein a transfer speed of a vertical CCD in the two field periods is higher than a transfer speed of the vertical CCD in the predetermined field period,
   said method further comprising
   a gain correction step of performing gain correction on the electric charges which cause smear and are equalized in said first equalization step, for each of the first pixels,
   wherein said first subtraction step includes subtracting the electric charges which cause smear and are subjected to the gain correction in said gain correction step from the signal charges which are held by the second holding unit, for each of the first pixels.

3. The driving method for the solid-state imaging device according to claim 1,
   wherein the frame period includes temporally-successive first, second and third field periods,
   the predetermined field period is the second field period,
   said first equalization step includes equalizing the electric charges which cause smear and are obtained from the incident light in the first field period and the electric charges which cause smear and are obtained from the incident light in the third field period, for each of the first pixels, and said first subtraction step includes subtracting the electric charges which cause smear and are equalized in said first equalization step from the signal charges which are obtained from the incident light in the second field period, for each of the first pixels, to calculate signal charges in the frame period.

4. The driving method for the solid-state imaging device according to claim 1,
wherein the frame period and an immediately-after frame period which appears immediately after the frame period include temporally-successive first and second field periods, respectively,
the predetermined field period is the second field period of the frame period,
said first equalization step includes equalizing electric charges which cause smear and are obtained from incident light in the first field period of the frame period and electric charges which cause smear and are obtained from the incident light in the first field period of the immediately-after frame period, for each of the first pixels, and
said first subtraction step includes subtracting the electric charges which cause smear and are equalized in said first equalization step from signal charges which are obtained from the incident light in the second field period of the frame period, for each of the first pixels, to calculate signal charges in the frame period.

5. The driving method for the solid-state imaging device according to claim 1,
wherein the two different field periods temporally and evenly spaced away from the predetermined field period are two field periods adjoining to the predetermined field period with the predetermined period interposed therebetween.

6. The driving method for the solid-state imaging device according to claim 1,
wherein the plurality of pixels include the first pixels and second pixels included in each column,
said method further comprising:
a third holding step of holding electric charges which cause smear and are obtained from incident light in a third holding unit, in the predetermined field period, for each of the second pixels;
a fourth holding step of holding signal charges which are obtained from the incident light in a fourth holding unit, in the subsequent field period, for each of the second pixels;
a second equalization step of equalizing electric charges which cause smear and are obtained from the incident light in a field period which appears subsequent to the subsequent field period and is spaced at a temporal distance equal to a distance from the subsequent field period to the predetermined field period, and the electric charges which cause smear and are held by the third holding unit, for each of the second pixels; and
a second subtraction step of subtracting the electric charges which cause smear and are equalized in said second equalization step from the signal charges which are held by the fourth holding unit, for each of the second pixels.

7. The driving method for the solid-state imaging device according to claim 6,
wherein a width of a potential well in a vertical transfer direction for use in transfer of the electric charges which cause smear by a vertical CCD is set narrower than a width of a potential well in the vertical transfer direction for use in transfer of the signal charges by the vertical CCD.

8. The driving method for the solid-state imaging device according to claim 6,
wherein the first pixels and the second pixels are arranged alternately in a column direction.

9. The driving method for the solid-state imaging device according to claim 6,
wherein the frame period and an immediately-after frame period which appears immediately after the frame period include temporally-successive first and second field periods, respectively,
the predetermined field period is the second field period of the frame period,
said first equalization step includes equalizing electric charges which cause smear and are obtained from incident light in the first field period of the frame period and electric charges which cause smear and are obtained from the incident light in the first field period of the immediately-after frame period, for each of the first pixels,
said first subtraction step includes subtracting the electric charges which cause smear and are equalized in said first equalization step from signal charges which are obtained from the incident light in the second field period of the frame period, for each of the first pixels, to calculate signal charges in the frame period,
said second equalization step includes equalizing electric charges which cause smear and are obtained from the incident light in the second field of the frame period and electric charges which cause smear and are obtained from the incident light in the second field period of the immediately-after frame period, for each of the second pixels, and
said second subtraction step include subtracting the electric charges which cause smear and are equalized in said second equalization step from signal charges which are obtained from the incident light in the first field period of the immediately-after frame period, for each of the second pixels, to calculate signal charges in the frame period.

10. The driving method for the solid-state imaging device according to claim 1,
wherein the electric charges which cause smear are obtained from the incident light in such a manner that no readout pulse for reading the signal charge is applied from the pixel to a vertical CCD.

11. A solid-state imaging device which has a plurality of pixels arranged in a matrix form and uses a frame period including a field period for acquiring signal charges of the pixels and a field period for acquiring electric charges causing smear, said solid-state imaging device comprising:
a first holding unit operable to hold electric charges which cause smear and are obtained from incident light, in a previous field period which is one of two different field periods temporally and evenly spaced away from a predetermined field period in the frame period and appears temporally earlier, for each of first pixels included in the plurality of pixels;
a second holding unit operable to hold signal charges which are obtained from the incident light, in the predetermined field period, for each of the first pixels;
a first equalization unit operable to equalize electric charges which cause smear and are obtained from the incident light in a subsequent field period which is the other one of the two field periods and appears temporally later, and the electric charges which cause smear and are held by said first holding unit, for each of the first pixels; and a first subtraction unit operable to subtract the electric charges which cause smear and are equalized by said first equalization unit from the signal charges which are held by said second holding unit, for each of the first pixels.

12. The solid-state imaging device according to claim 11,
wherein the plurality of pixels include the first pixels and second pixels included in each column,
said solid-state imaging device further comprising:
a third holding unit operable to hold electric charges which cause smear and are obtained from incident light, in the predetermined field period, for each of the second pixels;
a fourth holding unit operable to hold signal charges which are obtained from the incident light, in the subsequent field period, for each of the second pixels;
a second equalization unit operable to equalize electric charges which cause smear and are obtained from the incident light in a field period which appears subsequent to the subsequent field period and is spaced at a temporal distance equal to a distance from the subsequent field period to the predetermined field period, and the electric charges which cause smear and are held by said third holding unit, for each of the second pixels; and
a second subtraction unit operable to subtract the electric charges which cause smear and are equalized by said second equalization unit from the signal charges which are held by said fourth holding unit, for each of the second pixels.

13. The solid-state imaging device according to claim 12, further comprising:
a first vertical CCD which vertically transfers electric charges in a pixel in a predetermined column in a first direction;
a second vertical CCD which vertically transfers electric charges in a pixel in a column other than the predetermined column in a second direction opposite to the first direction, the vertical transfer being controlled by a common signal together with the vertical transfer of said first vertical CCD;
a first horizontal CCD which horizontally transfers the electric charges transferred from said first vertical CCD, the first horizontal CCD being disposed at one side of the region having the plurality of pixels arranged in a matrix form;
a second horizontal CCD which horizontally transfers the electric charges transferred from said second vertical CCD, the second horizontal CCD being disposed at the other side of the region having the plurality of pixels arranged in a matrix form so as to be opposite to the first horizontal CCD;
a first output unit operable to convert the electric charges transferred from said first horizontal CCD into a voltage value corresponding to the electric charges, and to output the voltage value to said first holding unit, said second holding unit, said third holding unit, said fourth holding unit, said first equalization unit and said second equalization unit; and
a second output unit operable to convert the electric charges transferred from said second horizontal CCD into a voltage value corresponding to the electric charges, and to output the voltage value to said first holding unit, said second holding unit, said third holding unit, said fourth holding unit, said first equalization unit and said second equalization unit,
wherein said first pixels and second pixels are arranged alternately in a column direction and a row direction.

* * * * *